United States Patent
Motoyama

(10) Patent No.: US 7,406,432 B1
(45) Date of Patent: Jul. 29, 2008

(54) PROJECT MANAGEMENT OVER A NETWORK WITH AUTOMATED TASK SCHEDULE UPDATE

(75) Inventor: Tetsuro Motoyama, Cupertino, CA (US)

(73) Assignee: Ricoh Company, Ltd., Tokyo (JP)

(*) Notice: Subject to any disclaimer, the term of this patent is extended or adjusted under 35 U.S.C. 154(b) by 1113 days.

(21) Appl. No.: 10/059,694

(22) Filed: Jan. 28, 2002

Related U.S. Application Data

(63) Continuation-in-part of application No. 09/881,250, filed on Jun. 13, 2001, now Pat. No. 7,191,141.

(51) Int. Cl.
    *G06F 17/50* (2006.01)
(52) U.S. Cl. .................................................. 705/7
(58) Field of Classification Search .............. 705/7, 705/8, 9
    See application file for complete search history.

(56) References Cited

U.S. PATENT DOCUMENTS

| | | | |
|---|---|---|---|
| 4,819,233 A | | 4/1989 | Delucia et al. ............... 717/129 |
| 4,875,162 A | | 10/1989 | Ferriter et al. ................. 705/29 |
| 5,197,001 A | * | 3/1993 | Mukherjee .................... 705/29 |
| 5,490,097 A | | 2/1996 | Swenson et al. ............. 364/578 |
| 5,537,541 A | | 7/1996 | Wibecan ........................ 714/45 |
| 5,548,506 A | | 8/1996 | Srinivasan |
| 5,603,020 A | * | 2/1997 | Hashimoto et al. ........... 707/200 |
| 5,699,310 A | | 12/1997 | Garloff et al. |
| 5,709,410 A | | 1/1998 | Reeves, Jr. .................... 283/67 |
| 5,765,140 A | | 6/1998 | Knudson et al. ................ 705/9 |
| 5,826,086 A | | 10/1998 | Arima et al. ................. 717/105 |
| 5,826,252 A | * | 10/1998 | Wolters et al. .................. 707/1 |
| 5,909,689 A | | 6/1999 | Van Ryzin |
| 6,101,481 A | * | 8/2000 | Miller ............................. 705/9 |
| 6,161,113 A | * | 12/2000 | Mora et al. .................. 715/505 |
| 6,236,409 B1 | | 5/2001 | Hartman ....................... 345/629 |
| 6,308,164 B1 | * | 10/2001 | Nummelin et al. ............. 705/9 |

(Continued)

FOREIGN PATENT DOCUMENTS

WO     WO 9849640 A1 * 11/1998

(Continued)

OTHER PUBLICATIONS

Janne "Developing WWW-Based Project Management Tools For a Large Scale Project", Dec. 1997, Tampere University of Technology, pp. 1-60.*

(Continued)

*Primary Examiner*—Romain Jeanty
(74) *Attorney, Agent, or Firm*—Hickman Palermo Truong & Becker, LLP

(57) ABSTRACT

A technique is provided for generating a hierarchy used in managing a development project by generating schedule data for a task and generating reference data for the task, wherein the reference data references tasks at other levels of a hierarchy that represents relationships among tasks for completing the project. Another technique is provided for managing a development project schedule by determining whether an update to schedule data associated with a particular task requires an update to other tasks hierarchically related to the particular task, by following references from the particular task to a parent task and from the parent task to its child tasks. Schedule data of the child tasks, for example, actual start and end dates, are compared to determine whether the parent schedule needs to be changed.

42 Claims, 26 Drawing Sheets

U.S. PATENT DOCUMENTS

| | | | |
|---|---|---|---|
| 6,351,734 B1 * | 2/2002 | Lautzenheiser et al. | 705/8 |
| 6,385,765 B1 | 5/2002 | Cleaveland et al. | 717/100 |
| 6,405,361 B1 | 6/2002 | Broy et al. | |
| 6,487,469 B1 * | 11/2002 | Formenti | 700/97 |
| 6,578,005 B1 * | 6/2003 | Lesaint et al. | 705/8 |
| 6,581,040 B1 * | 6/2003 | Wright et al. | 705/8 |
| 6,678,698 B2 | 1/2004 | Fredell et al. | 707/104.1 |
| 6,842,760 B1 | 1/2005 | Dorgan et al. | |
| 6,859,768 B1 | 2/2005 | Wakelam et al. | 703/1 |
| 6,895,382 B1 | 5/2005 | Srinivasan et al. | |
| 6,901,579 B1 | 5/2005 | Suguta | |
| 6,957,189 B2 * | 10/2005 | Poage et al. | 705/10 |
| 6,968,343 B2 * | 11/2005 | Charisius et al. | 707/102 |
| 7,107,268 B1 * | 9/2006 | Zawadzki et al. | 707/9 |
| 2002/0046394 A1 | 4/2002 | Do et al. | 717/108 |
| 2003/0200531 A1 | 10/2003 | Fairweather | |
| 2004/0162750 A1 | 8/2004 | Motoyama | |
| 2006/0053043 A1 * | 3/2006 | Clarke | 705/8 |

FOREIGN PATENT DOCUMENTS

WO    WO 99/04370    1/1999

OTHER PUBLICATIONS

Goldmann "Procura: a project management model of concurrent planning and design", Dec. 1996, 5th International Workshops of Enabling Technologies: Infrastructure for Collaborative Enterprises. pp. 1-2.*

Petrie et al "Agent-Based Project Management", Sep. 1999, Stanford Center for Design Research, pp. 1-25.*

Christenberry et al (Project and Employee Time Tracking), Nov. 1996, Georgia University, pp. 1-14.*

Janne "Developing WWW-Based Project Management Tools For a Large Scale Project", Dec. 1997, Tampa University of Technology Department of Information Technology, pp. 1-62.*

Mitchell "Managers get a needed boost with project linking", Dec. 1987, PC Week, v4, n50, p55(2), Dialog Accession No. 03021023.*

Steinbrecher "Project management software allows managers to plan, schedule, and control any project", Feb. 1987, Today's Office v21n9, Dialog file 15, Accession 00351477, pp. 8-14.*

Giridhar "The computerized project planning system", Dec. 1998, Transactions of AACE International, Dialog file 275, Accession No. 01103603 pp. PS13-PS16.*

Edwards "Project Management with the PC", Oct. 1984, PC Magazine, v3, n21, p. 109-117, Dialog file 275, Accession No. 01103603.*

Claims, Foreign application No. 07109677.0-1238, 3 pages.

European Patent Office, "European Search Report", Foreign application No. 07109677.0-1238, received Oct. 29, 2007, 8 pages.

Angermeier, George, "Cooperative Project Management with RPLAN", XP-002345614, Copyright Projekt Magazin, Oct. 2002 edition, 6 pages.

Maurer, Frank et al., "Merging Project Planning and Web-Enabled Dynamic Workflow Technologies", XP-002345613, IEEE Internet Computing, Jun. 2000, 10 pages.

Buchbinder et al., "Oracle Project Management, Release 11i", XP-002345049, Oracle, User guide, part No. B10895-02, May 2004, 354 pages.

Janne, "Developing WWW-Based Project Management Tools For a Large Scale Project", dated Dec. 1997, Tampa University of Technology Department of Information Technology, 80 pages.

"AMS Realtime Projects Advanced User Guide"; Advanced Management Solutions, Inc.; Dec. 1997: pp. 1-324.

Duncan, William R., "A Guide to the Project Management Body of Knowledge"; Dec. 1996; Project Management Institute Four Campus Boulevard, pp. 1-149.

Dialog "Primavera Extends Lead in High-End Project Management Software; Adds Powerful New Features, Functionality to P3" Apr. 1995; Business Wire, p. 04031181.

Katz, R. et al., "Project Performance and the Locus of Influence in the R&D Matrix"; Mar. 1995; The Academy of Managemetn Jorunal, vol. 28; pp. 67-87.

Jurison, J., "Software Project Management: The Manager's view"; Sep. 1999; Communications of the Association for Information Systems; pp. 1-57.

Mitchell, K., "Managers Get a Needed Boost with Project Linking"; Dec. 1997, PC Week, V4, n50, Dialog file 47, Accession No. 03021023.

Paynter, J., "Software engineering project management, estimation and metrics: Discussion summary and recommendations"; Dec. 1996; University of Auckland, New Zealand; pp. 500-503.

* cited by examiner

1. Project 1.1 Description of Project 1.2 Project Type

550

2. Project Duration (and Cost)

2.1 Project Duration 2.2 Project Cost (if necessary)

3. Project Members and Assignments

4. Goals

5. Objectives

6. Planning Intent (If necessary)

7. Technical Goals (If necessary)

8. Technical Issues and Risks (If necessary)

9. Patent Target

10. Criteria for Evaluation (If necessary)

11. Major Deliverables

12. Milestones

END OF FORM

J06 Project

Project Documents and Records

| Documents Number | Title and Description 602 |
|---|---|
| Q6-DJ06-vv | Project Documents |
| Q6-RJ06-II-zzz | Inspection Results |
| Q6-RJ06-MM-zzz | Meeting Records |
| Q6-DJ06-CC-zzz | Changes proposed, Decisions, etc. |
| Q6-RJ06-EE-zzz | Error Tracking |
| Q6-RJ06-yy | Other Records |

Zipped Project Source Code ~604

Current Risks

Project Schedule ~608

| Dates | Milestones |
|---|---|
| 5 Jan 2001 | Design Freeze |
| 15 Jan 2001 | Status Report |
| 17 Feb 2001 | Status Report |
| 23 Mar 2001 | Closing Meeting and Demo |

Requirements ~606

Current Task List ~610
   INDIVIDUAL 1
   INDIVIDUAL 2

MEMBER WEBSITE ~612
   INDIVIDUAL 1
   INDIVIDUAL 2

Index of Project Documents

| Document ID | Title | Rev | Date | Status (Withdrawn, Active, Draft) | Approval |
|---|---|---|---|---|---|
| Q6-DJ06-17 | Analysis of Software Development | 1.0 | 2Feb01 | Active | Approved |
| Q6-DJ06-16 | Project Review: Problems/Difficulties and Successes | 1.0 | 31Jan01 | Active | Approved |
| Q6-DJ06-15 | Implementation and Unit Test Plan | 1.0 | 12Dec00 | Active | Approved |
| Q6-DJ06-14 | Status Report on 7 December 2000 | 1.0 | 7Dec00 | Active | Approved |
| Q6-DJ06-13 | Design Review Request | 1.0 | 29Nov00 | Active | Approved |
| Q6-DJ06-12 | Status Report on 6 November 2000 | 1.0 | 6Nov00 | Active | Approved |
| Q6-DJ06-11 | Integration Test Plan for J06 Project | 0.1 | 26Oct00 | Active | Approved |
| Q6-DJ06-10 | J06 Software Specification | 1.10 | 25Jan01 | Active | Approved |
| Q6-DJ06-09 | Requirement Matrix for J06 Project | 1.3 | 31Jan01 | Active | Approved |
| Q6-DJ06-08 | J06 Project Plan | 1.4 | 14Dec00 | Active | Accepted |
| Q6-DJ06-07 | Requirements for J06 Project | 1.2 | 4Dec00 | Active | Approved |
| Q6-DJ06-06 | Organization and Use of the Project Directory for J06 | 1.1 | 20Oct00 | Active | Approved |
| Q6-DJ06-05 | Implementation and Unit Test Plan Guideline for J06 | 1.0 | 12Oct00 | Active | Approved |
| Q6-DJ06-04 | Code Conventions and Visual C++ | 1.1 | 15Dec00 | Active | Approved |
| Q6-DJ06-03 | Procedure for Source Code Control for J06 | 1.1 | 19Oct00 | Active | Approved |
| Q6-DJ06-02 | Design Document Guideline for J06 | 1.0 | 10Oct00 | Active | Approved |
| Q6-DJ06-01 | Project Initiation Form | 1.0 | 6Oct00 | Active | Approved |

700

To Archived Documents

FIG. 7A

| | | | | | |
|---|---|---|---|---|---|
| Publication | 27sep00 | 10oct00 | 10oct00 | 10oct00 | 10oct00 |
| Coding Convention | 29sep00 | 29sep00 | 11oct00 | 29sep00 | 11oct00 |
| Draft | 29sep00 | 29sep00 | 2oct00 | 29sep00 | 29sep00 |
| Review/Inspection | 29sep00 | 2oct00 | 11oct00 | 4oct00 | 11oct00 |
| Publication | 29sep00 | 11oct00 | 11oct00 | 11oct00 | 11oct00 |
| Implementation Plan and Unit Test Guideline | 29sep00 | 2oct00 | 12oct00 | 5oct00 | 12oct00 |
| Draft | 29sep00 | 2oct00 | 4oct00 | 3oct00 | 4oct00 |
| Review/Inspection | 29sep00 | 5oct00 | 12oct00 | 5oct00 | 12oct00 |
| Publication/Meeting | 29sep00 | 12oct00 | 12oct00 | 12oct00 | 12oct00 |
| Project Plan | 21sep00 | 25sep00 | 7oct00 | 25sep00 | 17oct00 |
| Draft | 21sep00 | 25sep00 | 29sep00 | 25sep00 | 29sep00 |
| Review/Inspection | 21sep00 | 2oct00 | 13oct00 | 2oct00 | 17oct00 |
| Publication | 21sep00 | 13oct00 | 13oct00 | 17oct00 | 17oct00 |

2. Design

| Tasks | Identified Date | Planned Start | Planned End | Actual Start | Actual End |
|---|---|---|---|---|---|
| Project Architecture | 2oct00 | 2oct00 | 31oct00 | 4oct00 | 19oct00 |
| Draft | 2oct00 | 2oct00 | 20oct00 | 4oct00 | 17oct00 |
| Review/Inspection | ~~2oct00~~ 19oct00 | 23oct00 | ~~31oct00~~ 19oct00 | ~~18oct00~~ | 19oct00 |
| Publication/Meeting | ~~2oct00~~ 19oct00 | ~~31oct00~~ 19oct00 | ~~31oct00~~ 19oct00 | 19oct00 | ~~19oct00~~ |
| Project Plan Revision | ~~2oct00~~ 19oct00 | ~~31oct00~~ 20oct00 | ~~2nov00~~ 24oct00 | 19oct00 | ~~23oct00~~ |
| Draft | ~~2oct00~~ 19oct00 | ~~31oct00~~ 20oct00 | ~~1nov00~~ 23oct00 | 19oct00 | 20oct00 |
| Review/Inspection | ~~2oct00~~ 19oct00 | ~~1nov00~~ 23oct00 | ~~2nov00~~ 24oct00 | 23oct00 | 23oct00 |
| Publication | ~~2oct00~~ 19oct00 | ~~2nov00~~ 24oct00 | ~~2nov00~~ 24oct00 | 23oct00 | 23oct00 |
| Package Design | 19oct00 | 20oct00 | 15nov00 | 20oct00 | 1nov00 |
| Sender Service | | | | | |
| Draft | 20oct00 | 20oct00 | 23oct00 | 20oct00 | 23oct00 |
| Review | 20oct00 | 24oct00 | 26oct00 | 24oct00 | 26oct00 |
| Receiver Service | | | | | |
| Draft | 20oct00 | 20oct00 | 23oct00 | 20oct00 | 23oct00 |
| Review | 20oct00 | 24oct00 | 26oct00 | 24oct00 | 26oct00 |

FIG. 12

| | Office Solutions and Systems Development Group | Record Ctrl No.: Q6-RJ06-U-090 |
|---|---|---|
| RICOH RICOH Corporation | Division: SUPPORT | Form Number: Q6-F010-01 Rev Number 1.3 |
| Inspection Form | | Project Number: J06 |

Meeting Date: 26 Oct 2000  Time: 9:06 - 9:09

Project: J06   Release: _____

Document: SENDER SERVICE   Moderator: AF

Time Spent for Preparation: AF 1/60 — 1302

Meeting Type: Inspection (I)

Inspection Type: Document (Doc)

Result: Accept (A) — 1304

Defect Type:
DA = Data, DC = Documentation, FN = Functionality, IF = Interface, LO = Logic, I/O = Input/Output, HF = Human Factors, MN = Maintainability, PF = Performance, SN = syntax, ST = Standards, OT = Other Defect Class: M = Missing, W = Wrong, E = Extra (need to be removed), U = Unclear Defect Severity: J = Major, N = Minor Defect                                                                                           1300

| Location | Defect Description | Type | Class | Sever |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 13

| Task | Planned Start Date | Planned End Date | Estimated Deviation (Uncertainty) | Actual Completion Dates |
|---|---|---|---|---|
| Design Document Guidelines for J06 | 28Sep00 | 13Oct00 | 0 | 10Oct00 |
| Code Convention for J06 | 29Sep00 | 13Oct00 | 0 | 11Oct00 |
| Implementation and Unit Test plan guideline for J06 | 2Oct00 | 13Oct00 | 0 | 12Oct00 |
| Source Code Control Procedure for J06 | 2Oct00 | 13Oct00 | 0 | 11Oct00 |
| Project Requirements | 2Oct00 | 16Oct00 | 0 | 16Oct00 |
| Requirements Matrix | 17Oct00 | 19Oct00 | 1 | 18Oct00 |
| J06 Project Plan | 27Sep00 | 17Oct00 | 0 | 17Oct00 |
| Integration Test Plan | 21Sep00 | 31Oct00 | 1 | 26Oct00 |
| Design Document -General Architecture | 2Oct00 | 31Oct00 | 1 | 19Oct00 |
| Revise J06Project Plan schedule | ~~31Oct00~~ 20Oct00 | ~~2Nov00~~ 25Oct00 | 1 | 23Oct00 |
| Design Documentation - Package and Class Design | ~~1Nov00~~ 20Oct00 | ~~22Nov00~~ 15Nov00 | 2 | 2Nov00 |
| TM — Sender Service | 20Oct00 | 26Oct00 | 1 | 26Oct00 |
| TM — Receiver Service | 20Oct00 | 26Oct00 | 1 | 26Oct00 |
| TM — ODBC Interface in Monitor_Send | 24Oct00 | 31Oct00 | 1 | 27Oct00 |
| TM — ODBC Interface in Receive_Store | 27Oct00 | 1Nov00 | 1 | 27Oct00 |
| TM — Database in Monitor_Send | 31Oct00 | 7Nov00 | 2 | 30Oct00 |
| TM — Database in Receive_Store | 31Oct00 | 7Nov00 | 2 | 30Oct00 |
| TM — Device Information | 3Nov00 | 10Nov00 | 2 | 31Oct00 |
| TM — Parser | 8Nov00 | 15Nov00 | 2 | 1Nov00 |
| AF — Device Monitor | 23Oct00 | 27Oct00 | 1 | 27Oct00 |
| AF — Data Transfer | 25Oct00 | 1Nov00 | 1 | 30Oct00 |
| AF — Data Retriever | 30Oct00 | 7Nov00 | 2 | 1Nov00 |
| AF — POP3 Processor | 3Nov00 | 10Nov00 | 2 | 2Nov00 |
| AF — Receiver Manager | 8Nov00 | 15Nov00 | 2 | 2Nov00 |
| Revise J06 Project Plan schedule | 22Nov00 | 28Nov00 | 1 | 3Nov00 |
| Design Documentation - Class Specification | ~~22Nov00~~ 3Nov00 | ~~5Jan01~~ 14Dec00 | 4 | 29Nov00 |

FIG. 14

PROJECT MANAGEMENT OVER A NETWORK WITH AUTOMATED TASK SCHEDULE UPDATE

CROSS REFERENCE TO RELATED APPLICATION

This is a continuation-in-part of U.S. patent application Ser. No. 09/881,250, entitled "Automated Management Of Development Project Files Over A Network", filed by Tetsuro Motoyama on Jun. 13, 2001 now U.S. Pat. No. 7,191,141, the contents of which are herein incorporated by reference in its entirety for all purposes.

FIELD OF THE INVENTION

The present invention relates generally to project management and, more specifically, to automatically updating hierarchical task schedules over a network.

BACKGROUND OF THE INVENTION

Product development projects typically require significant effort to monitor and manage. Furthermore, computer software development projects are inherently difficult to manage. This difficulty is partly due to the large number of tasks and associated deliverables that comprise a software package and the vastness of paperwork and project files associated with these tasks and deliverables. Another contributing factor are the complex interdependencies established between individual tasks and deliverables during the development cycle of a software package.

Management of development projects typically includes organizing, maintaining, and controlling access to project documents, schedules, and the like. Furthermore, there are often multiple development projects occurring concurrently within an enterprise organization, thus significantly expanding the document management efforts. Historically, management of a master project schedule entails, among other tasks, manually entering data into a scheduling application, manually creating links between schedules, and manually aggregating individual developers' task schedules into the master project schedule. These are cumbersome and error-prone tasks, with little to no oversight and quality control.

A master project schedule is often in a state of flux, whereby management solicits the developers for task statuses and related schedule updates. Often, the feedback provided to management by the developers has little oversight and is not according to a rigid policy, procedure, or verification process. Thus, the actual status of a project schedule is often difficult to ascertain since the progress of individual tasks are dictated by subjective, and often self-supporting, progress reports by those individuals that are assigned to the task.

For example, some scheduling systems allow a developer to signify that a task is partially completed, i.e., ninety percent completed. This information is then entered into the scheduling system to determine whether the project is on-schedule. However, because there is generally no accountability as to whether an individual's status is reliable, the current process of obtaining project status tends to shadow the realistic progress of the project.

In view of the foregoing, there is a clear need for a technique for management of interdependent development project task schedules that reduces the manual tasks related thereto.

SUMMARY OF THE INVENTION

A technique is provided for generating a hierarchy used in managing a development project by generating schedule data for a task and generating reference data for the task, wherein the reference data references tasks at other levels of a hierarchy that represents relationships among tasks for completing the project. In one embodiment, the relationships represent dependencies among tasks in the hierarchy such that completion of a parent task requires completion of one or more child tasks. Another technique is provided for managing a development project schedule by determining whether an update to schedule data associated with a particular task requires an update to other tasks hierarchically related to the particular task, by following references from the particular task to a parent task and from the parent task to its child tasks. Schedule data of the child tasks, for example, actual start and end dates, are compared to determine whether the parent schedule needs to be changed. Appropriate updates are determined accordingly. Hence, an update to an individual task schedule triggers an update of higher-level project schedules, when necessary.

Another technique is provided for managing a development project schedule, where the individual task schedules are automatically updated based on inspection results from an inspection team, typically comprising two or more inspectors, to inspect a project task product. The schedules, and consequently the updates thereof, are governed by a policy specifying that a task cannot be partially completed. The inspection results are linked to the individual task schedules, which are linked to the associated project schedule, whereby they are made available to authorized persons over a network.

Another technique is provided for managing project files over a network. Using this technique, a project is proposed through an on-line project initiation form. Acceptance of the project proposal triggers the creation of individual sites for each individual specified to contribute to the project, where individual task schedules and draft project files can be linked to the individual site. Furthermore, the individual sites are linked to a project site and associated file directories are automatically created and also linked to the project site. Upon passing inspection by the inspection team, a draft file is changed to an official file and the official file is denoted accordingly.

These automated techniques provide advantages over prior manual processes, including but not limited to, ensuring the quality and integrity of and controlling access to project files and schedules, and minimizing work-load and potential errors related to management and manipulation of the project files and schedules.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5C is a continuation of the exemplary printed/displayed project initiation form of FIG. 5B;

FIG. 6 illustrates an example of a project site, according to an embodiment of the invention;

FIG. 7A illustrates an example of a project document index, according to an embodiment of the invention;

FIG. 12 illustrates an example of an individual task schedule, according to an embodiment of the invention;

FIG. 13 illustrates a printed or displayed example of an on-line inspection form which is utilized to automatically update an individual task schedule, according to an embodiment of the invention;

FIG. 14 illustrates an example of a management schedule, according to an embodiment of the invention;

DETAILED DESCRIPTION OF THE INVENTION

Techniques for automating tasks involved in the management of a development project are described. The techniques are described herein primarily in reference to a software development project, but those skilled in the art should recognize that the benefits of the invention are also available when applying the techniques to other development projects. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Operating Environment

Figure 1:
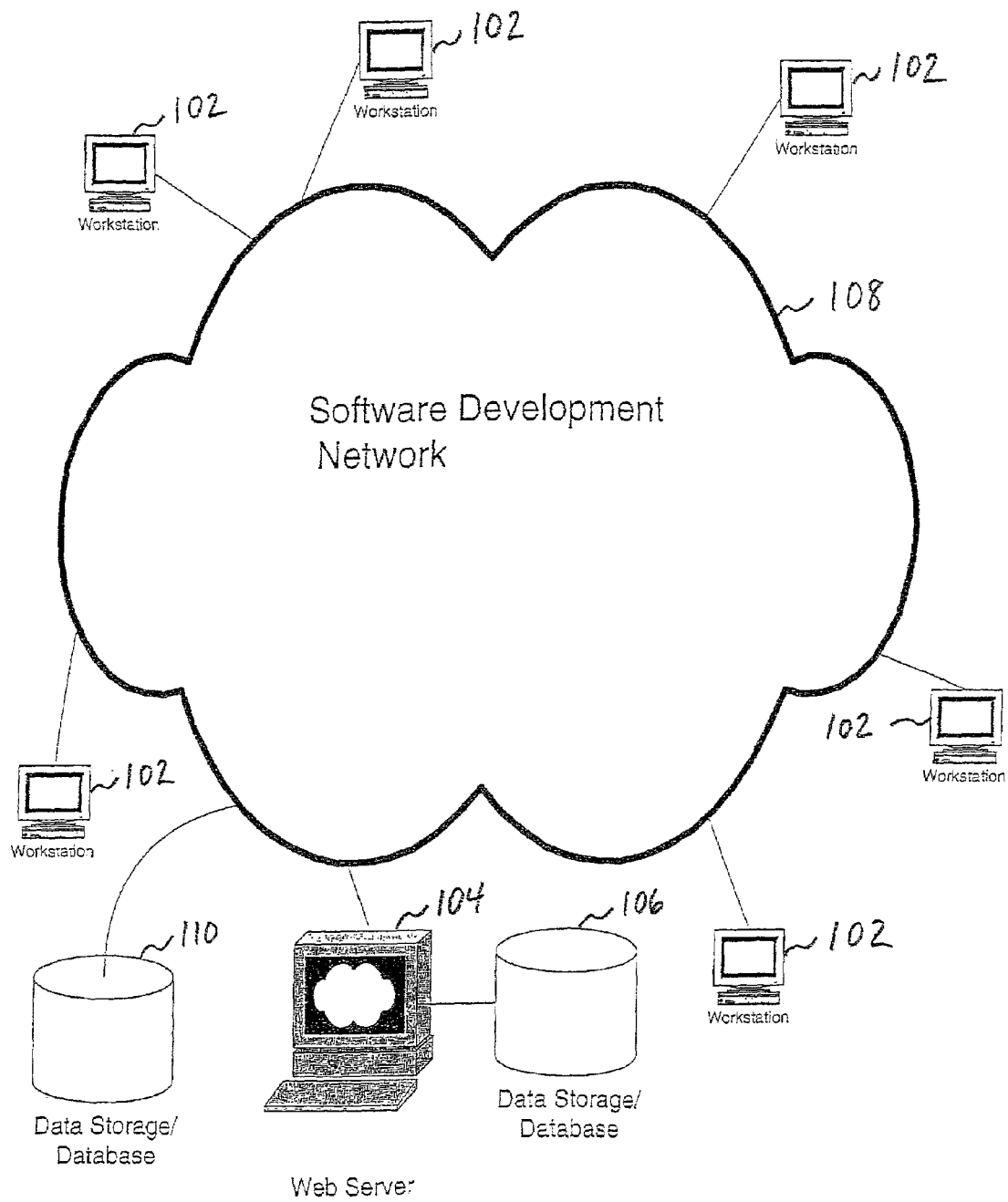
FIG. 1 illustrates an example of an operating environment in which aspects of the invention can be implemented.

FIG. 1 illustrates a non-limiting example of an operating environment in which aspects of the invention can be implemented. The example operating environment comprises a plurality of workstations 102, a web server 104, and a database 106, all connected directly or indirectly to a software development network 108 for communication therebetween. Optionally, a database 110 may be present for reasons described below.

Figure 2:
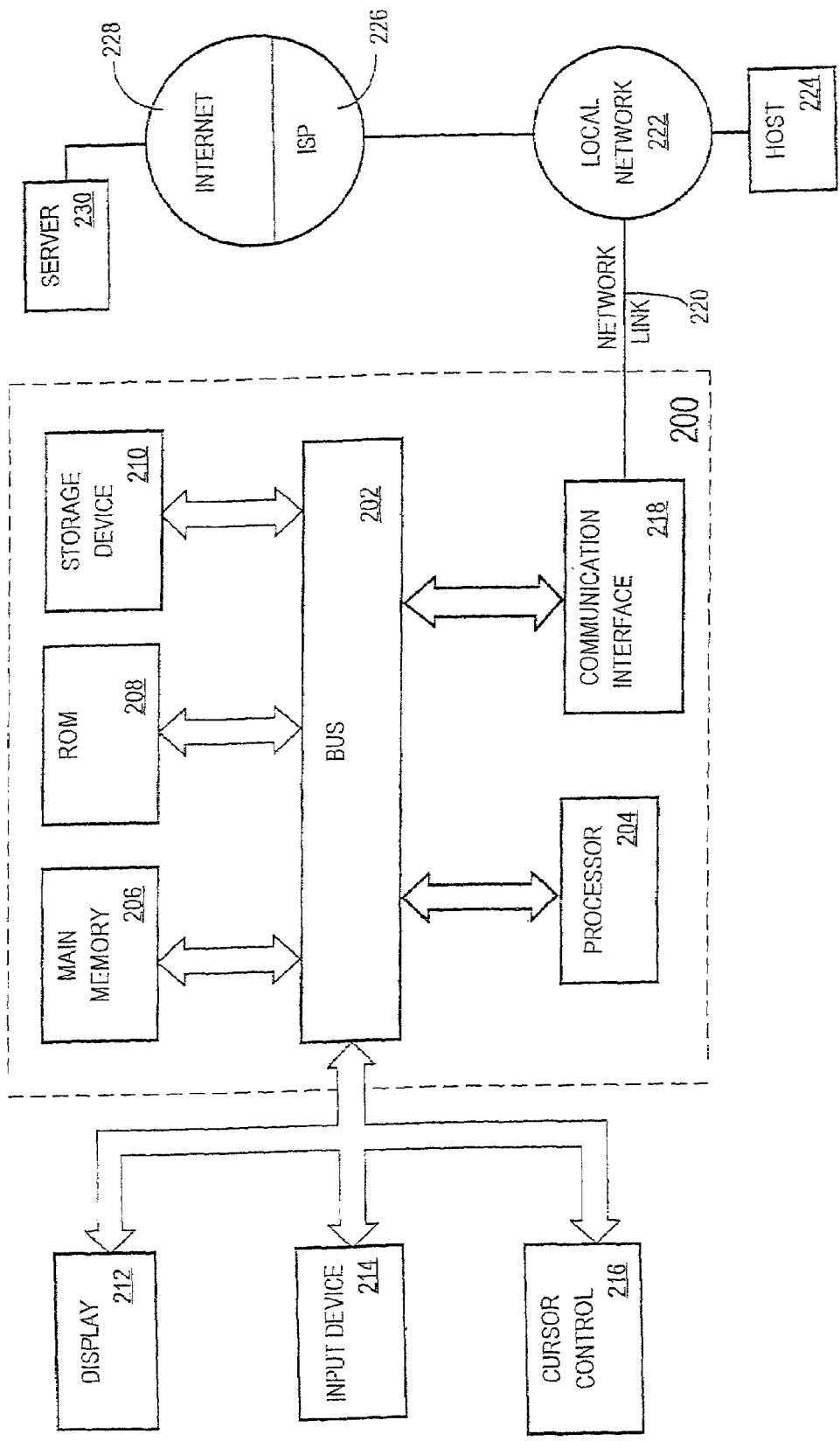
FIG. 2 is a block diagram that illustrates a computer system upon which embodiments of the invention can be implemented.

Workstations 102 are typically computer systems configured as illustrated by the computer system 200 of FIG. 2, and are utilized, for example, by the software engineers/developers to complete tasks associated with a development project. Pertinent non-limiting examples of such tasks include initiating projects, preparing and maintaining task schedules, designing software architecture, creating specifications, creating software code, implementing and testing software code, inspecting various task products, etc. In addition, project managers utilize workstations 102 for accessing information to review and manage the progress of the project. The developers and managers transmit communications through the network 108 to the other connected components, i.e., web server 104 and database 106.

Web server 104 depicts a conventional web server, which is a combination of computer hardware and software that, using the appropriate protocols (e.g., Hypertext Transfer Protocol [HTTP] and Transmission Control Protocol/Internet Protocol [TCP/IP]), serves the files that form web pages (e.g., Hypertext Markup Language [HTML] or Extensible Markup Language [XML] files), to users, such as developers or managers at a workstation 102. In general, the majority of information exchanged and managed during the development project life cycle is served by the web server 104 over the network 108. Furthermore, aspects of the techniques for automating management of development project files, as described herein, may be implemented and executed on the web server 104, although practice of the invention is not limited to such an implementation. The techniques could also be implemented on any other processing system, such as workstation 102 or a similarly configured computer system as illustrated in FIG. 2.

Database 106 depicts a conventional database for storing information related to the development project, thus providing access to the information by authorized individuals at workstations 102 or web server 104, through queries transmitted over the network 108. The type of information stored on database 106 is virtually limitless, non-limiting examples including project initiation forms, individual and aggregated management task schedules, specifications, software code, inspection reports, web page files, and document directories and indexes. In addition, other information may be stored on the database 106, as illustrated in and described in reference to FIG. 3. In alternative operating environments, a conventional database 110 is connected directly to the network 108 as a database server.

Network 108 depicts a conventional network, e.g., a packet-switched network, for facilitating the exchange of information between and among various connected components, such as workstation 102, web server 104, and database 106. The network 108 may be a Local Area Network (LAN), such as a conventional Ethernet, Fast Ethernet, a token ring, or a wireless LAN such as specified in 802.11a and 802.11b (developed by a working group of the Institute of Electrical and Electronics Engineers [IEEE]), which may be implemented within an enterprise. In addition, network 108 may also be a Wide Area Network (WAN), such as the Internet, for facilitating communication with remote users through a Virtual Private Network (VPN), or the network 108 may represent a combination of a LAN and a WAN. In addition, network 108 can be formed using a variety of different mediums, including but not limited electrical wire or cable, optical, or wireless connections.

Hardware Overview

FIG. 2 is a block diagram that illustrates a computer system 200 upon which embodiments of the invention can be implemented. Computer system 200 additionally illustrates a non-limiting example of a system configuration of the workstation 102 (FIG. 1) and the web server 104 (FIG. 1). Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk, optical disk, or magneto-optical disk, is provided and coupled to bus 202 for storing information and instructions.

Computer system 200 may be coupled via bus 202 to a display 212, such as a cathode ray tube (CRT) or a liquid crystal display (LCD), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Examples of non-volatile media include, without limitation, optical, magnetic disks, or magneto-optical disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, without limitation, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

Project Database

Figure 3:
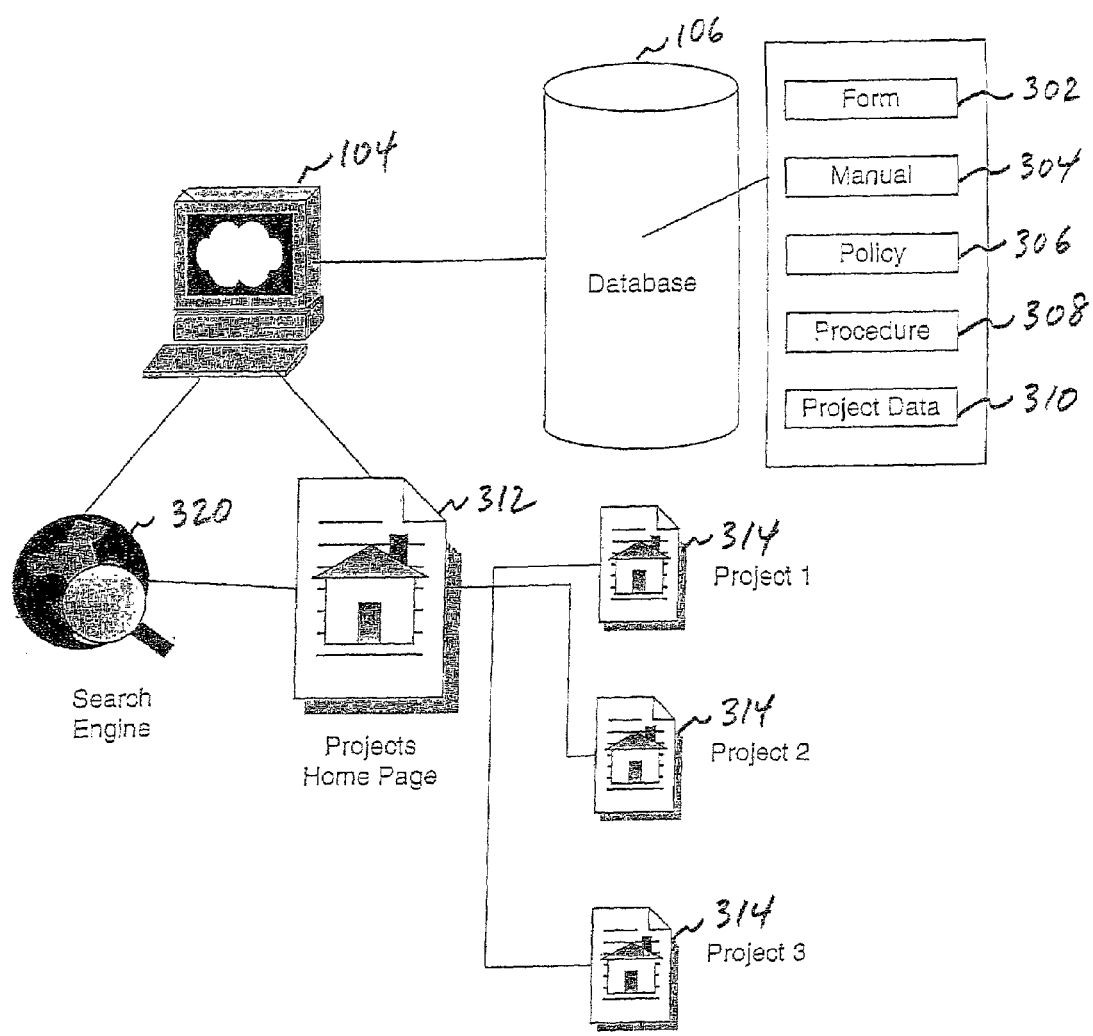
FIG. 3 illustrates examples of data components of a database and web components, according to an embodiment of the invention.

FIG. 3 illustrates a non-limiting example of data components of the database 106 and web components. Database 106 can store files representing various project documents, some being generic project-related documents employed by an enterprise for providing guidance with respect to administering and controlling development projects, and some being specific to a particular project. For examples of generic documents, the database can be configured to store, without limitation, one or more template forms 302 for use by project participants (i.e., engineer/developers, managers, and others), such as a project initiation form (see FIGS. 5B and 5C for a printed example of an interactive project initiation form) or an inspection form (see FIG. 13 for a printed example of an interactive inspection form); and one or more manuals 304, policies 306, and procedures 308, for instructing project participants on enterprise infrastructure, policy and procedures, at least with respect to development projects. The forms 302 facilitate the interactive input of information into the system database 106 and are primarily used by the clients, or individual project participants, and also define the printed outputs.

Figure 19:
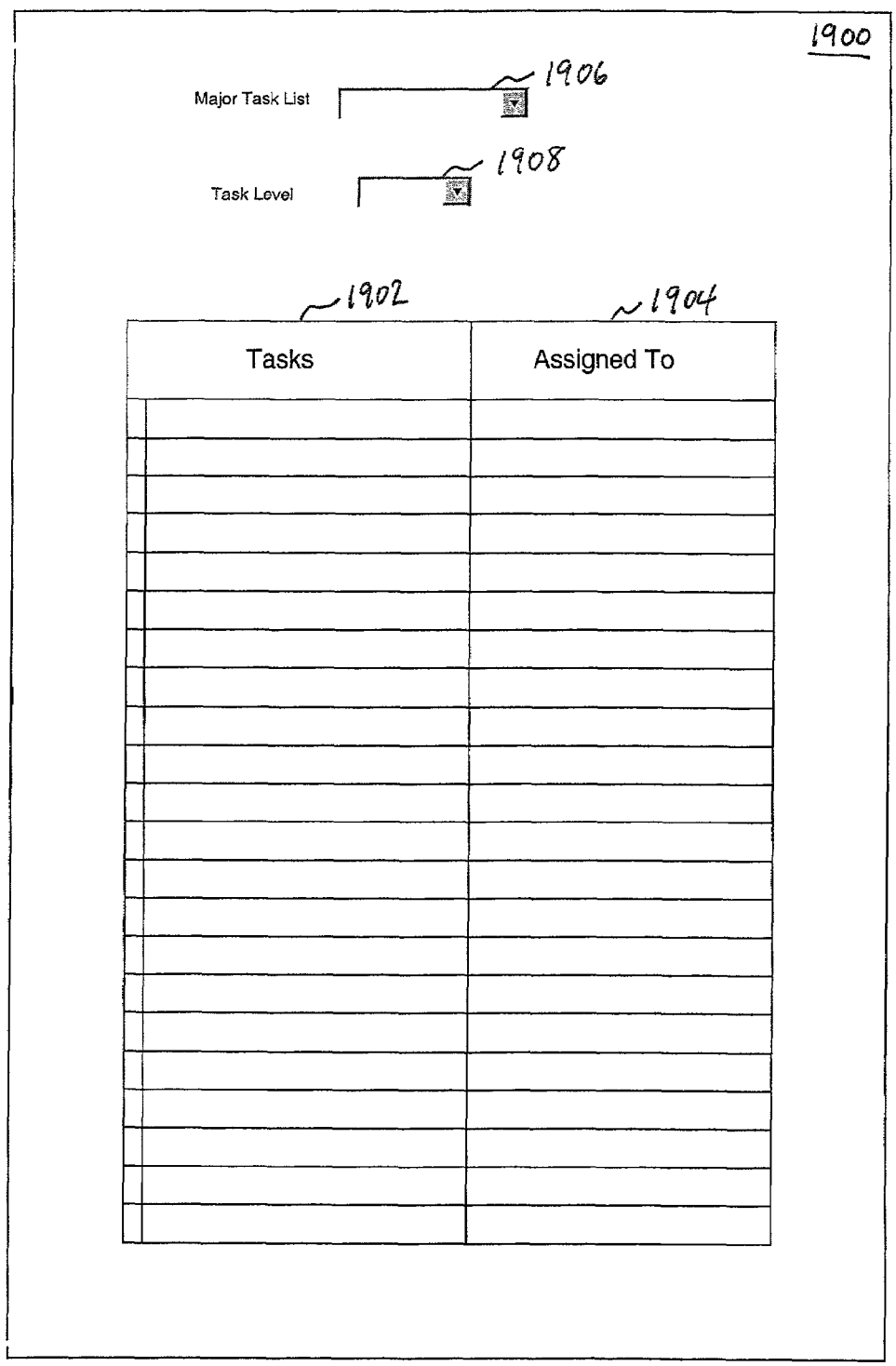
FIG. 19 illustrates an example of an on-line task assignment form, according to an embodiment of the invention.
Figure 20:
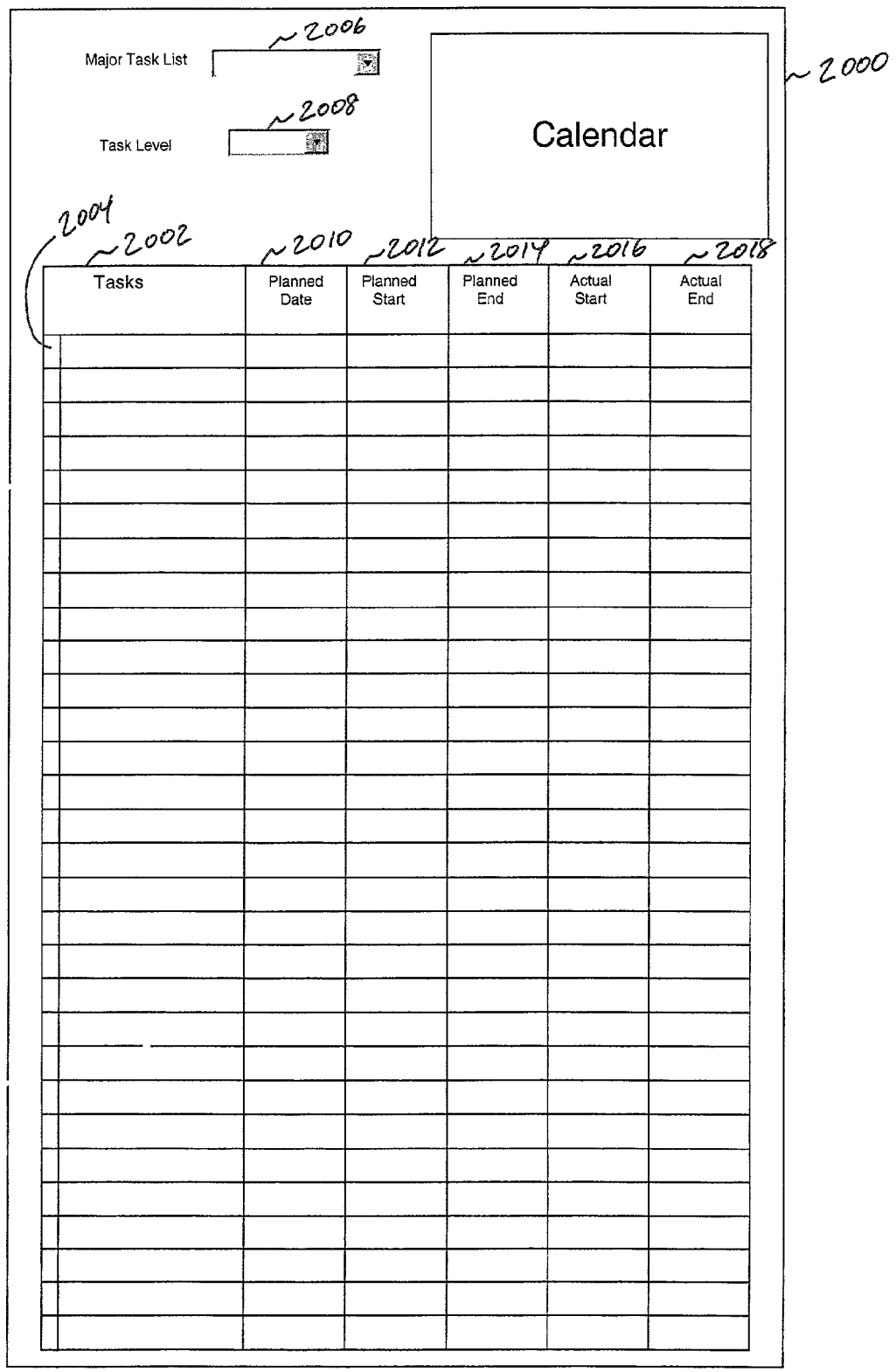
FIG. 20 illustrates an example of an on-line individual task scheduler form, according to an embodiment of the invention.

Project data 310 refers to project-specific documents that may include, but are not limited to, completed project initiation forms (see FIGS. 5B and 5C), individual task schedules (see FIG. 12), aggregated management task schedules (see FIG. 14), specifications, software code, completed inspection forms (see FIG. 13), web page files, document directories and indexes, task assignment forms (see FIG. 19), and individual task scheduler forms (see FIG. 20). Note that the document directories and indexes, and the task assignment and individual task scheduler forms, may alternatively or additionally be stored on the database 110 (FIG. 1). A project participant working on a workstation 102, or alternatively on web server 104, can utilize a search engine 320 to access the database 106 and search for the various generic and project-specific documents.

Different levels of project-specific information can be accessed from the database 106, as is depicted by a projects home page 312 and one or more project sites 314. The projects home page 312 provides links to the one or more project sites 314. As is known in the art, a link is a selectable connection from one word, picture, or information object to another. One non-limiting example of an implementation of a link is a hyperlink, utilizing a suitable protocol and language such as HTTP and HTML, respectively. The links allow a user to access the project sites 314 from the home page 312, by enacting the link. The link is enacted typically through use of the cursor control 216 (FIG. 2) and/or the input device 214 (FIG. 2), by interacting with an appropriate application such as a conventional web browser. Examples of the information that is linked to, and thus accessible from, the project sites 314 are described below.

Initiating Automated Project File Management

Figure 4A:
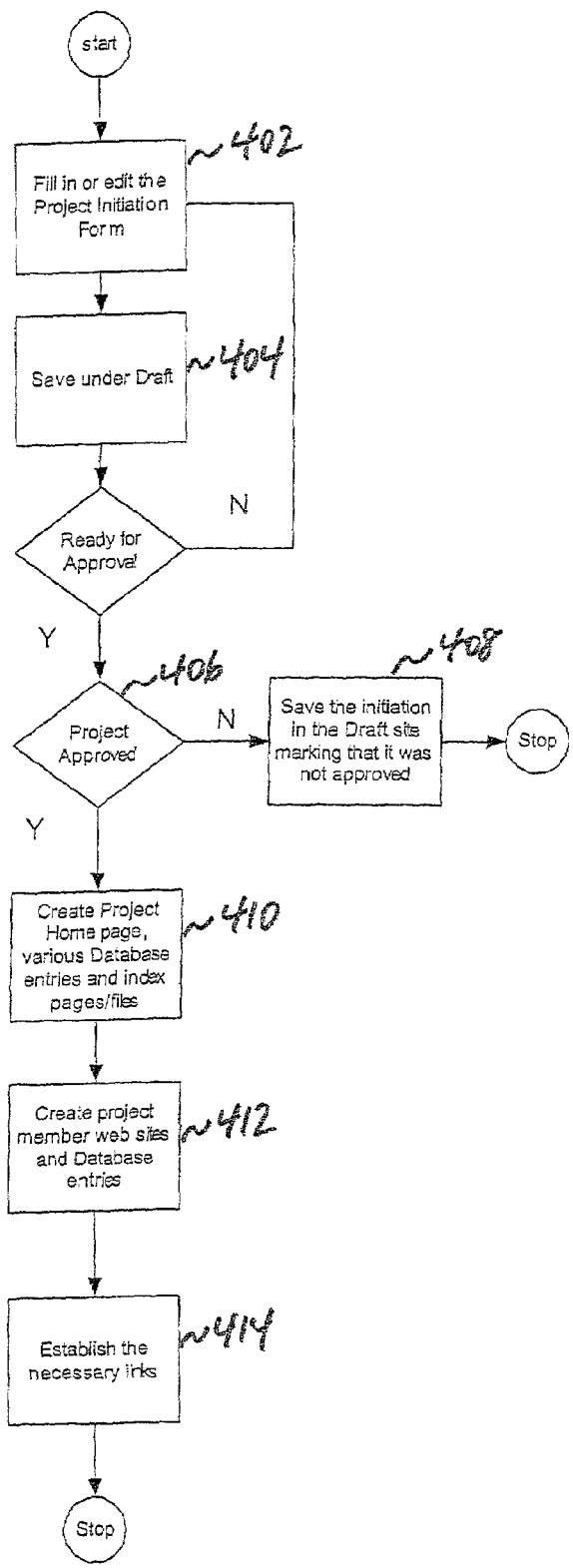
FIG. 4A is a flow chart illustrating steps for initiating automated management of project files over a network, according to an embodiment of the invention.
Figure 5A:
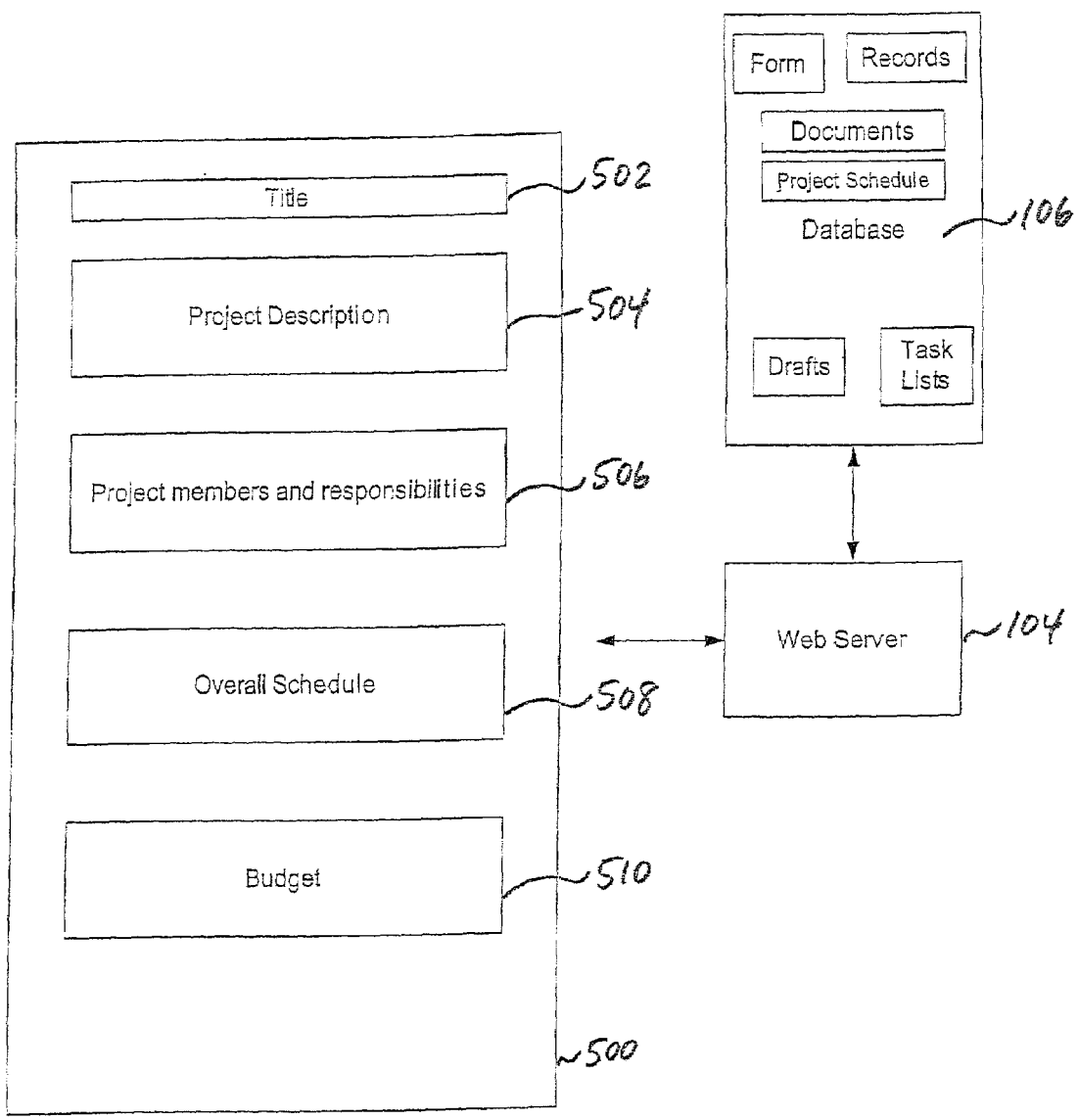
FIG. 5A is a block diagram of an arrangement for initiating a project via an on-line interactive form, according to an embodiment of the invention.

FIG. 4A is a flow chart illustrating steps for initiating automated management of project files over a network, according to an embodiment of the invention. First, at step 402, an individual completes a project initiation form for submission to management for project approval. FIG. 5A is a block diagram of an arrangement for initiating a project via an on-line interactive project initiation form 500. The interactive form can be an HTML or XML based page. The project initiator enters the necessary information, for a non-limiting example, the project title 502, project description 504, anticipated project members and responsibilities 506, overall schedule 508, and budget 510, through a network interface, such as a web browser. The entered information is transmitted through the web server 104 to the database 106, where it is initially stored in draft form prior to approval of the requested project, at step 404 of FIG. 4A. Furthermore, the initiator can revise the draft form until proceeding to the project authorization/approval process. The blocks of information depicted in database 106 in FIG. 5A comprise the various information that can be extracted and presented in a project home page or site, such as project site 600 of FIG. 6.

Figure 5B:
FIG. 5B illustrates an example of a printed or displayed project initiation form that can be utilized in an embodiment of the invention.

An example of a printed or displayed project initiation form 550, illustrating pertinent information headings with the information excluded, is illustrated in FIGS. 5B and 5C. The interactive project initiation form 500 (as exemplified also as form 550) is available from the form 302 (FIG. 3) component of database 106 (FIG. 1), and is linked to other data in the database 106 for automated entry of some data fields. The format of the printed/displayed project initiation form 550 is associated with the form 302.

Referring back to FIG. 4A, at decision block 406 it is determined whether the appropriate project approval authority has approved the proposed project. If the project is not approved, then at step 408 the project initiation form is marked to indicate that the project is not approved, and is stored as a draft in the database 106. Upon approval of the proposed project, at step 410 the project is automatically assigned a project number and an official project site, such as project site 314 (FIG. 3), is automatically created and linked to the project home page, such as project home page 312 (FIG. 3). In addition, various database 106 entries and index pages are created at step 410. At step 412, web sites for individual project participants are created; and linked to the appropriate official project site, at step 414. In addition, the necessary entries are created in the database 106, and linked to the appropriate skeleton files that are utilized by the project participants. The project participants are able to link any working or draft documents to their individual site, whereby the documents will be available to authorized project members through the appropriate chain of links from the project home page, i.e., projects home page 312. Access permissions are restricted and controlled according to document control policies. In certain embodiments, a directory of project files associated with the project is created, stored in the database 106 and database 110 (FIG. 1), and linked to the project site (as shown in FIG. 6). Sub-directories and indexes can be created, as applicable, and linked to the appropriate directory entry on the project site.

Inspection Process—Client

Figure 4B:
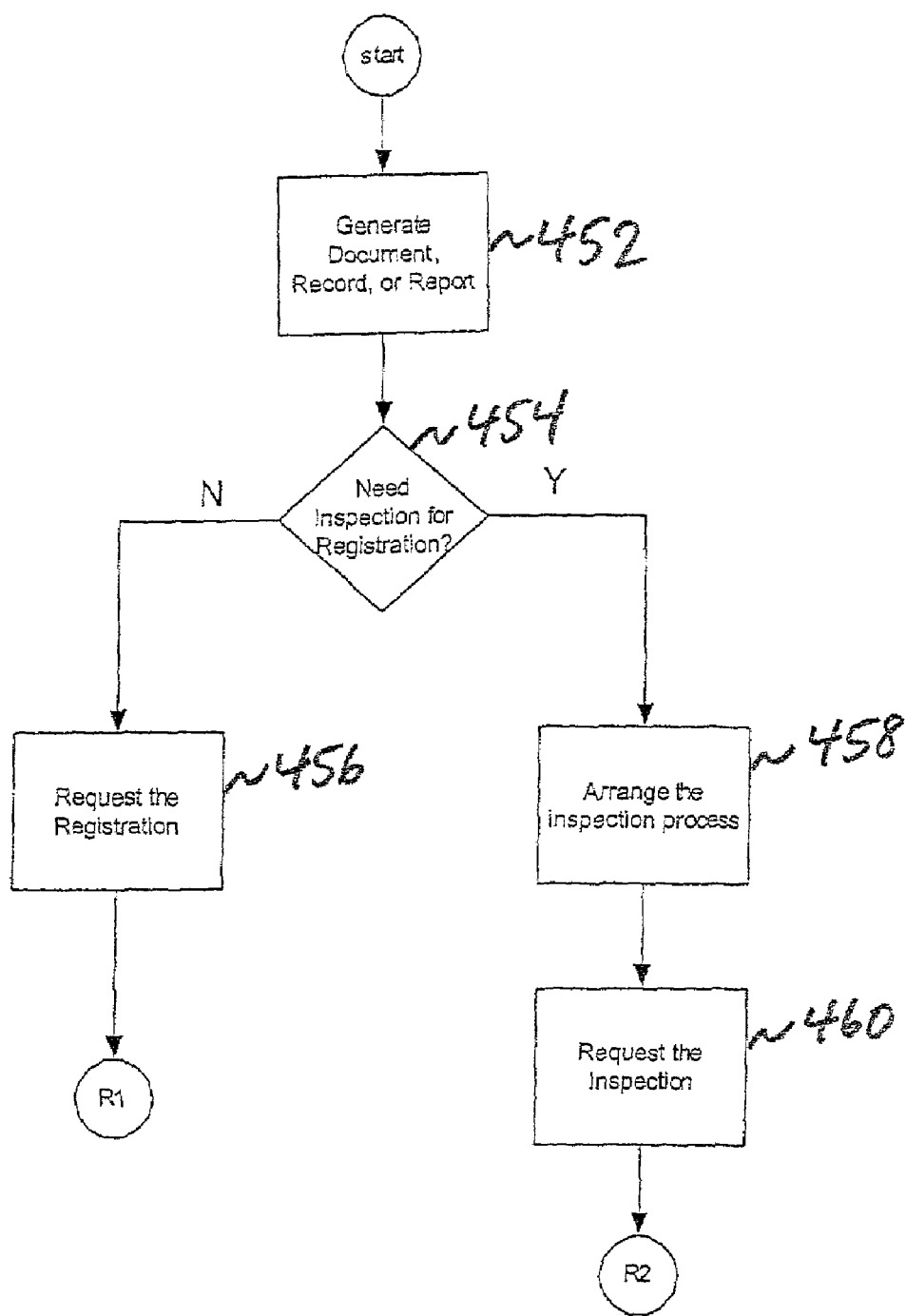
FIG. 4B is a flowchart illustrating steps an individual (client) performs in relation to the document inspection process, according to an embodiment of the invention.
Figure 4C:
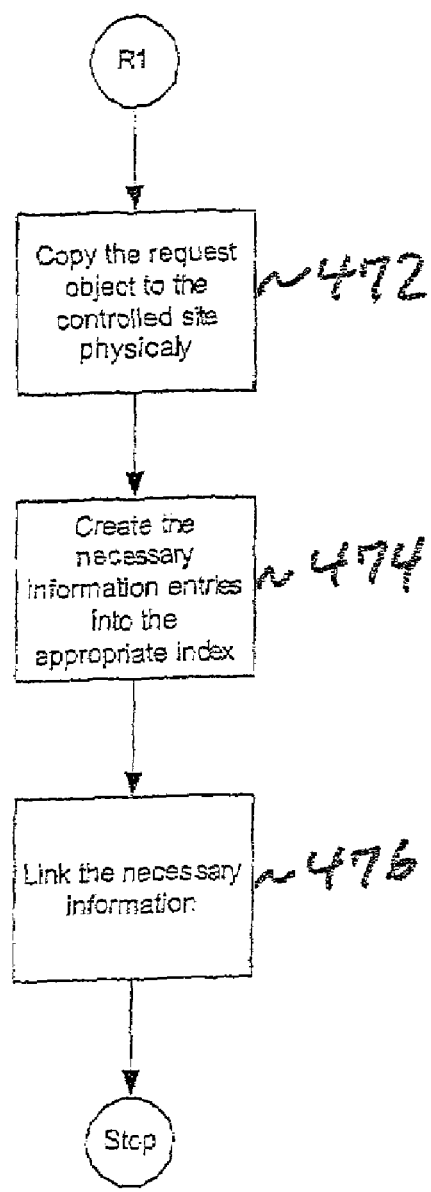
FIG. 4C is a flowchart illustrating a server-side process continuing from R1 of FIG. 4B, according to an embodiment of the invention.

FIG. 4B is a flowchart illustrating steps an individual (client) performs in relation to the document inspection process, according to one embodiment. At step 452, a document, record, or report (reference material) is generated by an individual project participant. At the decision block of step 454, it is determined whether the reference material is the type that requires inspection to ensure quality. For example, some information, such as technical information and records, may not require the quality inspection. In this case, at step 456, the individual requests registration of the document, whereby the flow goes to R1, which is illustrated in FIG. 4C. If inspection of the reference material is deemed necessary to ensure quality, the individual arranges inspection thereof, at step 458. At step 460, an inspection is requested whereby it is registered in the project file management system, to be managed by the processes described herein. In this case, the flow goes to R2, which is illustrated in FIG. 4D.

Inspection Process—Server

FIG. 4C is a flowchart illustrating the server-side process continuing from R1 of FIG. 4B, where the reference material is not inspected and where document registration is requested. At step 472, the reference material is copied into database 106 (FIG. 1) under a controlled environment so that the individual who created the material is no longer able to modify it. Alternatively, the material is copied into a secure file system and a reference to the material is saved in the database 106. At step 474, information entries, for example, the document reference number, the title, date, and originator, are created in the appropriate index page (see 700 of FIG. 7A). At step 476, links are created from the index page to the appropriate documents and corresponding document fields.

Figure 4D:
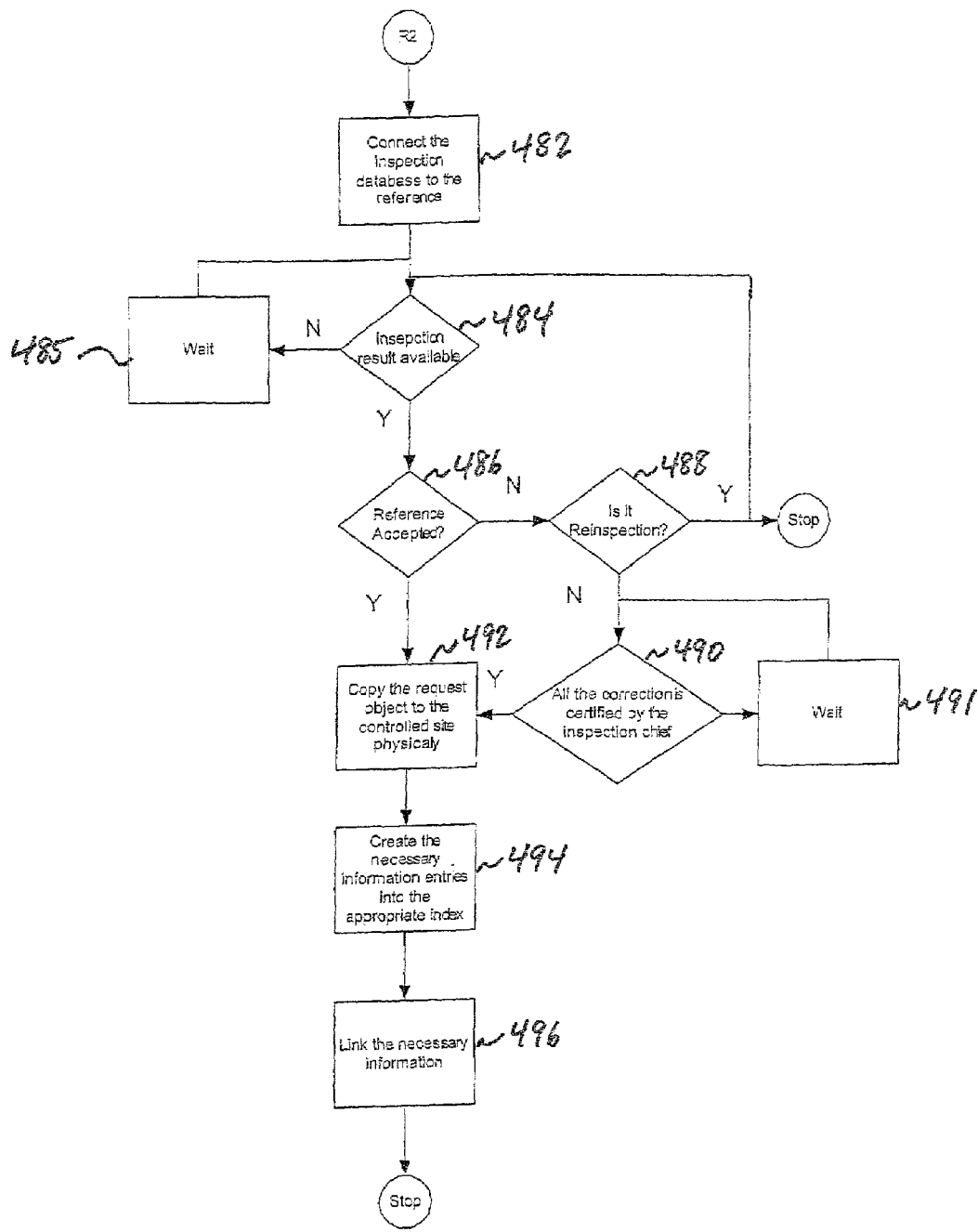
FIG. 4D is a flowchart illustrating the server-side process continuing from R2 of FIG. 4B; according to an embodiment of the invention.

FIG. 4D is a flowchart illustrating the server-side process continuing from R2 of FIG. 4B, where an inspection of the reference material is requested. Generally, the file management system embodying the file management processes described herein, monitors whether the requested inspection completes on schedule and thus, whether inspection results are available. At step 482, an inspection result object (see 774 of FIG. 7B) is linked to the reference material. At decision block 484, it is periodically determined whether inspection results are available. If inspection results are not yet available, the process essentially waits for a certain period to pass, at step 485, and then returns to block 484 to look for inspection results. Once inspection results are available, they are analyzed. At decision block 486, the inspection result is analyzed to determine whether the reference material is denoted as accepted by the associated inspector. If it is determined that the material is not accepted, then at step 488 it is determined whether the material requires re-inspection or if it is conditionally accepted (a disposition different than accepted). If the material requires re-inspection, the database is updated accordingly. At this point, the process could return to block 484 to determine if additional inspection results are available. If the material is conditionally accepted, the flow goes to decision block 490, where the material is checked to determine whether it is modified to meet the specified conditions from the inspection report, and whether the corrections are certified by an inspection chief. If the material is not yet certified by the inspection chief, at step 491, the process waits for a period and returns to block 490.

Once it is determined at decision block 490 that the material has been certified by the inspection chief, the process continues to step 492, which is the same step that is performed if the reference material is accepted at block 486. At step 492, the current inspection material is copied into database 106 (FIG. 1) under a controlled environment so that the individual who created the material is no longer able to modify it. At step 494, information entries, for example, the document reference number, the title, date, and originator, are created in the appropriate index page (see 700 of FIG. 7A). At step 496, links are created from the index page to the appropriate documents and corresponding document fields.

Project Web Pages

FIG. 6 illustrates an example of a project site 600, with links (underlined entities) to several other pages of information specific to a particular project (in this case, the J06 project as shown at top of project site 600). Links include, but are not limited to, a directory 602 of official project documents and records; a project source code link 604; a project requirements link 606; a project schedule link 608; one or more current task list links 610 and member web site links 612 for individuals, i.e., engineers/developers, working on the project.

The directory 602 presents links to indexes of various official documents and records associated with the project, for non-limiting examples, project documents, inspection results, meeting records, changes, error tracking, and other records.

The project schedule link 608 provides access to the aggregated management task schedule, which is exemplified in and described in reference to FIG. 14. The current task list link 610 provides access to the task schedules of each individual assigned tasks for the project, which is exemplified in and described in reference to FIG. 12. Furthermore, the relation between the individual task schedules, accessed via current task list link 610, and the aggregated management task schedule, accessed via project schedule link 608, is described in detail below under the headings "Management Schedule Generation" and "Updating a Project Schedule." Finally, the member website link 612 provides access to one or more individual web sites, the creation of which is described above in reference to step 408 of FIG. 4. The individual web sites provide access to draft documents being worked on by the individual, as well as to the individual task lists (see FIG. 12).

Figure 7B:
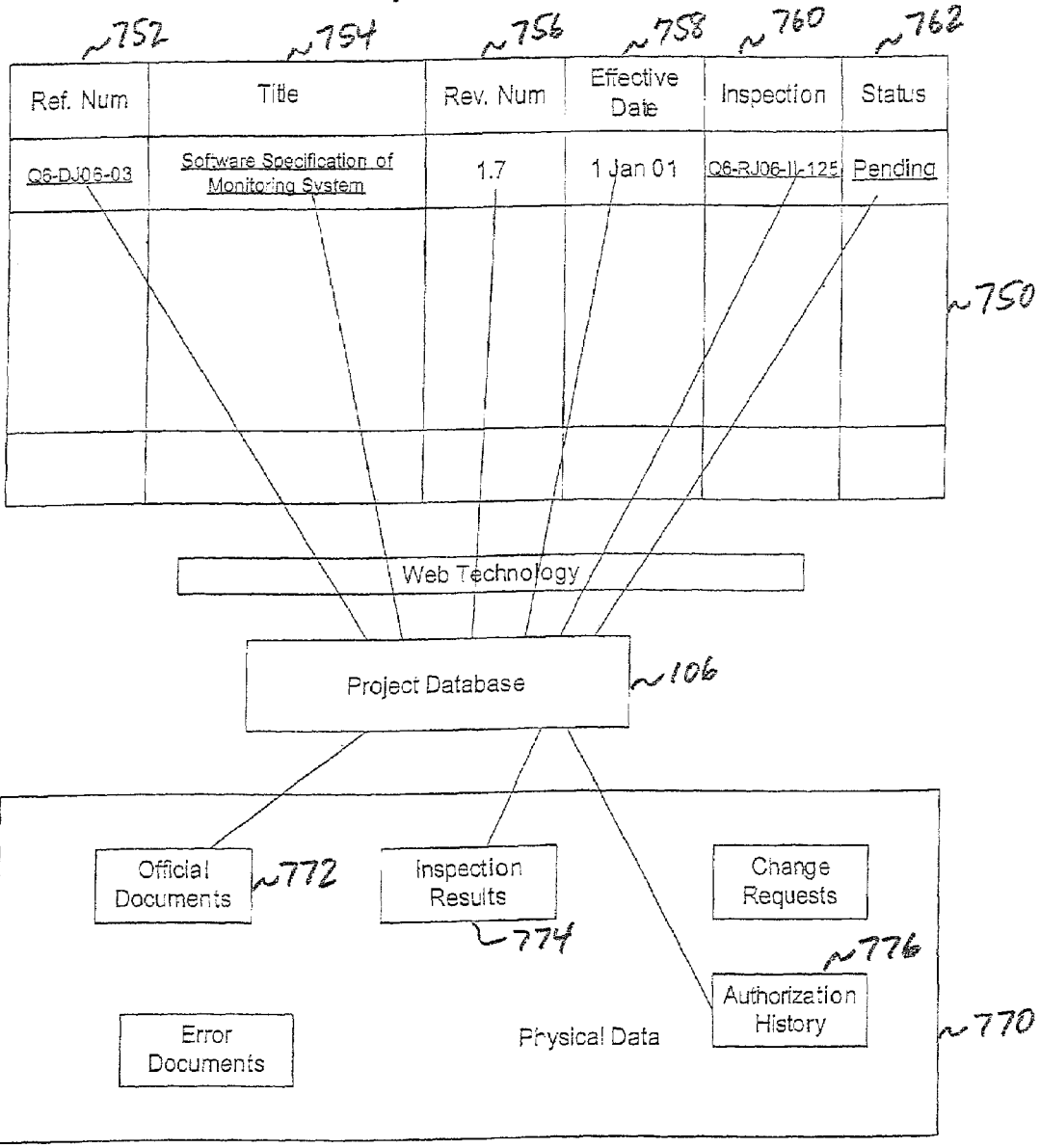
FIG. 7B illustrates link relationships between an example web index page, the project database, and electronic or physical files/objects managed by the database, according to an embodiment of the invention.

FIG. 7A illustrates an example of an index 700, which is an "Index of Project Documents." The index 700, and any other indexes linked to the directory 602, includes links to actual files stored in the database 106 (FIG. 1). FIG. 7B illustrates the link relationships between an example index web page 750, the project database 106, and electronic or physical files/objects 770 managed by the database 106. A reference number 752, a document title 754, and a revision number 756 are linked to the same object, that is, official documents 772. Effective date 758 corresponds to the date that the document is effective or last revised in correspondence with the revision number 756. An inspection 760 field is linked to the inspection results 774 corresponding to the inspections performed on the document. Status 762 presents the current status of the indexed document, that is whether the document is still awaiting authorization from the appropriate party. The status 762 field is linked to the authorization history object 776. The information included in the index web page 750, under the management of the database 106, is displayable to a client through a web browser interface.

Method for Managing Project Files Over a Network

Figure 8:
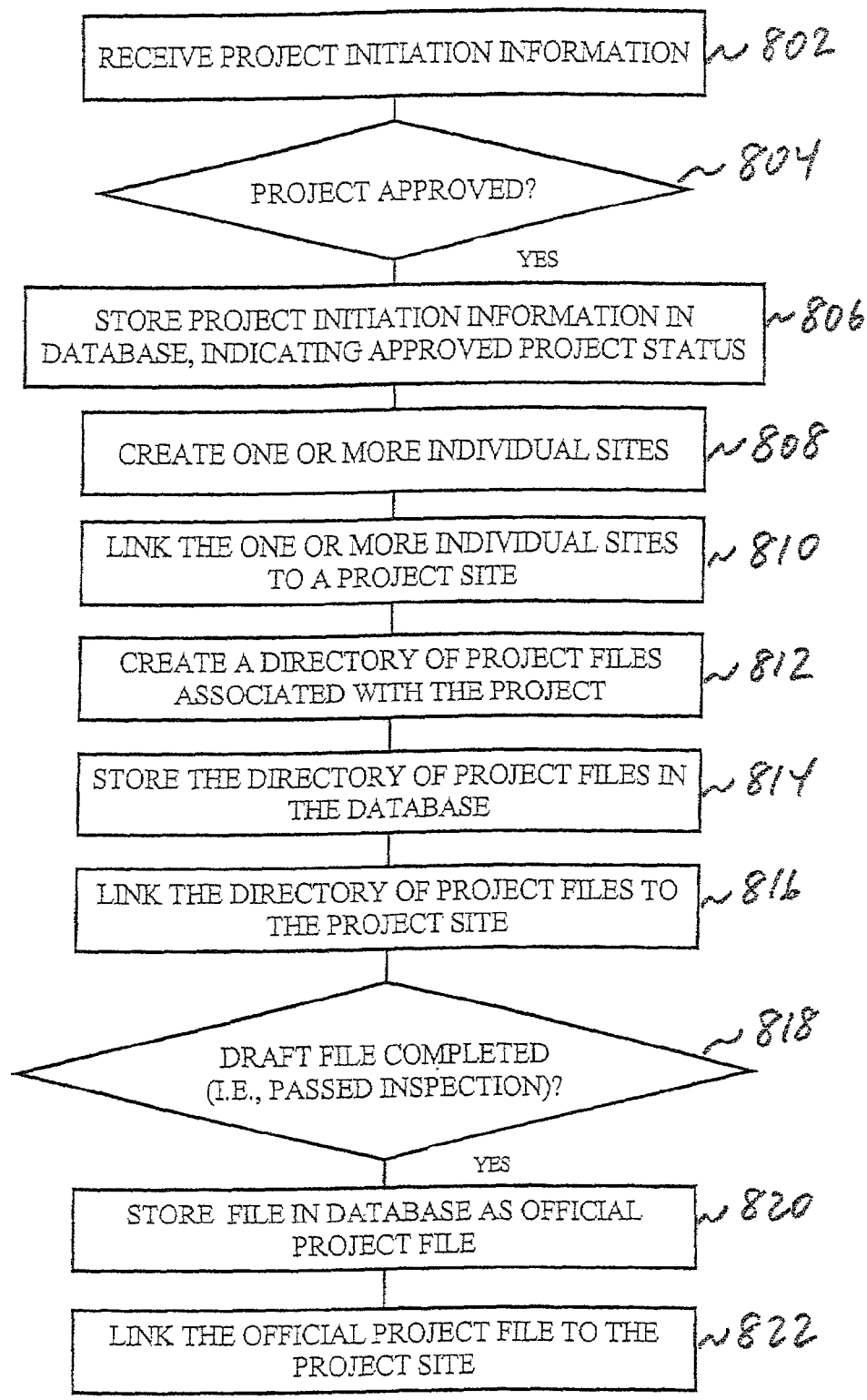
FIG. 8 is a flow chart illustrating steps for managing project files over a network, according to an aspect of the invention.

FIG. 8 is a flow chart illustrating steps for managing project files over a network, according to an aspect of the invention. Project initiation information, preferably including at least a description of the project and of individuals performing a project task, is received at step 802. A non-limiting example of the information received at step 802 is illustrated in the project initiation form 550 of FIGS. 5B and 5C. At step 804, it is determined whether the project has been approved by the appropriate entity. At step 806, if the project is approved, the project initiation information is stored in a database such as database 106 (FIG. 1 and FIG. 3) in a manner that indicates that the project is approved.

At step 808 of FIG. 8, an individual web site, or page, is created for each of the individuals working on the project.

Various informational and work product documents can be linked to the individual web sites; for example without limitation, draft files and task schedules. Access to this information is typically regulated and is available to authorized individuals over a network. At step 810, the individual sites are linked to the project site, as exemplified by member web site 612 of project site 600 (FIG. 6). A directory of files associated with the project is created at step 812, which is stored in the database at step 814. The directory of files is linked to the project site at step 816, as exemplified by directory 602 and described in the associated text in reference to FIG. 6.

At step 818 of FIG. 8, it is determined whether a draft file is completed, where completion is defined as passing inspection. This criteria which defines a completed file serves at least the following purposes: it ensures the quality and integrity of the file, as a result of the inspection by two or more persons related to the project but not the creators of the file; and it clarifies whether a task is completed by providing a binary completion status, i.e., the task is recorded as completed or not without allowing recordation of a percentage of completion.

Upon completion of a draft file, the status of the file is changed from draft to official and it is stored in the database 106 indicating its status, at step 820. Alternatively, the physical file may be copied into the secure file system and the reference to the file stored in the database 106. Finally, at step 822, the official file is linked to the project site. As exemplified in reference to FIG. 6 and FIG. 7, the official file may be indirectly linked to the project site through a link to an index, such as index 700, which is in turn linked to a directory, such as directory 602, which is presented on the project site, such as project site 600.

Figure 9:
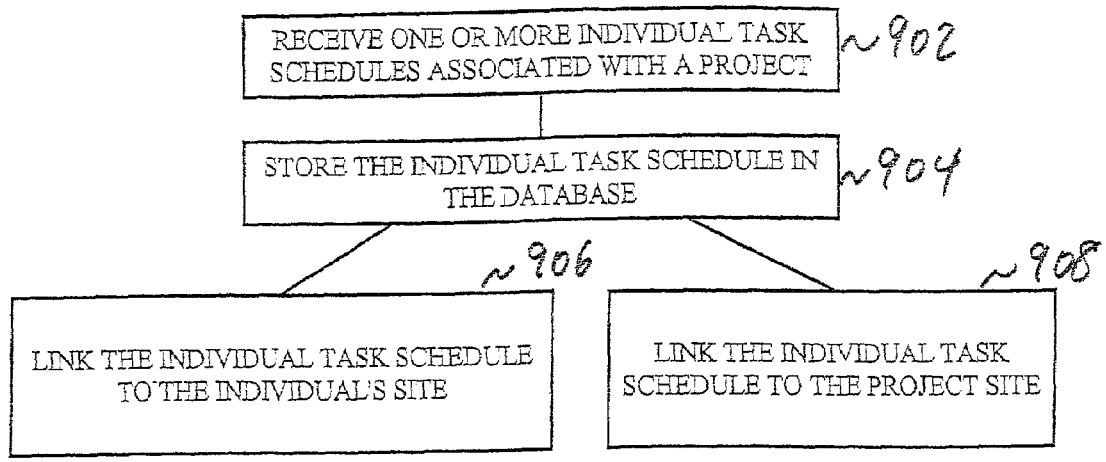
FIG. 9 illustrates an embodiment of the method of FIG. 8, wherein individual task schedules are automatically managed.

FIG. 9 illustrates an embodiment of the method of FIG. 8, wherein individual task schedules are automatically managed. At step 902, one or more task schedules are received from individuals working on the project. At step 904, the individual task schedules are stored in the database 106 (FIG. 1). Steps 906 and 908, which can complete in any order, include at step 906, automatically linking the individual task schedule to the associated individual's site which is accessible via current task list link 610 of FIG. 6, and at step 908, automatically linking the individual task schedule to the project site. The project site link is depicted as current task list link 610 and described in the associated text in reference to FIG. 6.

Management Schedule Generation

Figure 10:
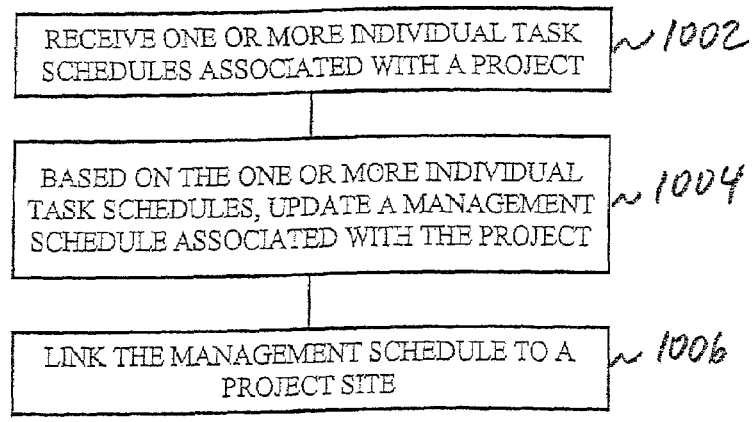
FIG. 10 illustrates another embodiment of the method of FIG. 8, wherein a summary management schedule is automatically managed.

FIG. 10 illustrates another embodiment of the method of FIG. 8, wherein a summary management schedule is automatically managed. At step 1002, one or more task schedules are received from individuals working on the project. At step 1004, a management schedule associated with the same project is updated based on the individual task schedules. An advantage of having the individual task schedules linked to the management task schedule is that the management task schedule can automatically update upon changes to the individual task schedules. At step 1006, the management task schedule is linked to the project site, as depicted as project schedule link 608 and described in the associated text in reference to FIG. 6.

Figure 11:
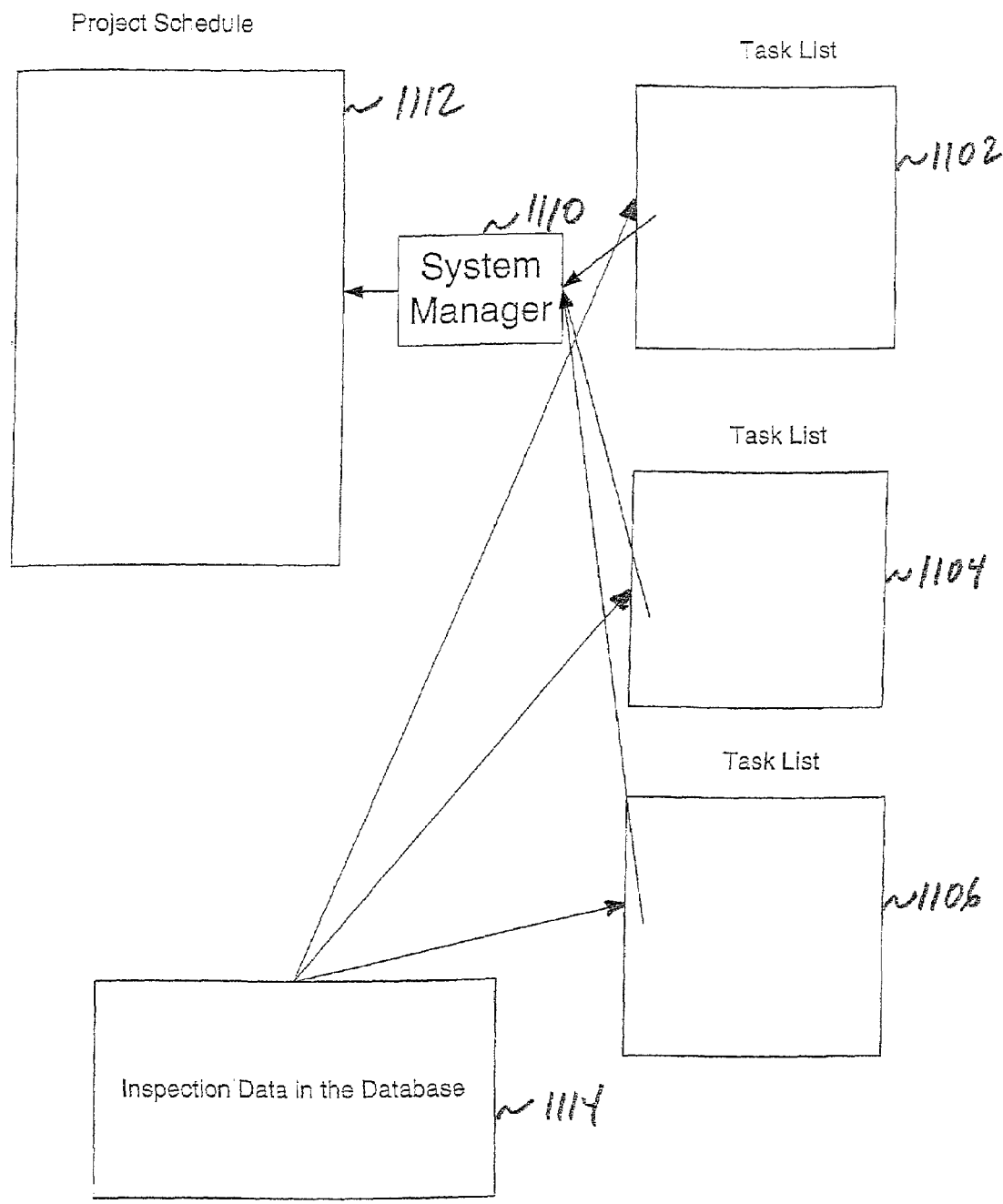
FIG. 11 is a block diagram illustrating associations utilized to manage a project schedule, according to an aspect of the invention.

FIG. 11 is a block diagram illustrating link associations that are used to manage a project schedule by automatically updating the project schedule, according to an aspect of the invention. In this example, multiple task lists 1102, 1104, and 1106 (see FIG. 12 for an example of an individual task list/schedule) are linked to a system manager 1110, which embodies methods for managing the project schedule as described herein. The task lists 1102-1106 are for individuals working on the project, and each task list is typically associated with a separate individual, although practice of the invention is not so limited. The project schedule 1112 (or "management schedule") is an aggregation of the individual task lists 1102-1106, and typically does not include task definitions at the level of detail as the individual task schedules. Hence, the project schedule 1112 summarizes the individual task lists 1102, 1104, and 1106. For example, FIG. 14 illustrates an example of a management schedule 1400, which is described in further detail below.

The completion of each task in the individual task schedules is linked to inspection forms, completed versions of which are stored in the database 106 (FIG. 1). For example, FIG. 13 illustrates an example of a printed or displayed inspection form 1300, which is described in further detail below. Upon a positive disposition by the inspection team that has inspection authority with respect to an individual task product, the associated task is considered completed. In one embodiment, the status of each task is binary variable, in that a task cannot be recorded as partially completed. For example, according to the project file management techniques described herein, a task is either completed or not completed, but not a percentage completed. Thus, only after the authorized task inspection team has completed the inspection of the task product and has stored a completed inspection form in the database 106, does the task product receive an "accepted," or similar, disposition. In certain embodiments, the individual task schedule is automatically updated based on the results of the completed inspection forms. In addition, once the individual task lists 1102, 1104, and 1106 are updated, the project schedule 1112 is subsequently updated based on the updated individual task lists 1102, 1104, and 1106 (for example, as described in reference to FIG. 21).

FIG. 12 illustrates an example of an individual task schedule 1200 for an individual "TM." FIG. 13 illustrates an example of a printed or displayed on-line inspection form 1300. In one embodiment, individual task schedule 1200 and inspection form 1300 provide status data that is used to automatically generate or update a management schedule 1400, as illustrated in FIG. 14. This process is facilitated by the links described in reference to FIG. 11. Upon completion of an inspection form (such as form 1300), an individual task schedule (such as task schedule 1200) is updated according to the completed inspection form, and a management schedule (such as schedule 1400) is consequently updated.

Referring to FIG. 13, document reference 1302 is mapped to the same task in the related individual task schedule. Note that the document reference 1302 does not refer to documents only, but more generally to products of individual tasks. Furthermore, a result reference 1304 is mapped to the "Actual End" column 1208 (FIG. 12) of the related individual task schedule, such as schedule 1200 of FIG. 12. The date that is automatically entered into the "Actual End" column 1208 is automatically determined based on the latest acceptance completion date for all of the required inspection forms (i.e., "Accept" in result reference 1304) for a particular task. The method includes logic for determining when all of the inspections are completed, and whether all of the completed inspection forms have indicated "Accept" in result reference 1304, in order to determine the "Actual End" date for column 1208. Alternatively, if the inspection result is conditional acceptance, the chief inspector must signal that all of the corrections are incorporated into the product as shown at step 490 in FIG. 4D.

Referring to FIG. 12 and FIG. 14, certain cells of the task schedule 1200 are mapped to the management schedule 1400. For example, cell 1202 of task schedule 1200, which is associated with the earliest "Planned Start" of a particular task, is mapped to cell 1402 of management schedule 1400. Similarly, cell 1204, which is associated with the latest "Planned End" of a particular task, is mapped to cell 1404. Thus, if data in cell 1202 or 1204 is added, revised, or deleted, cell 1402 or 1404 is automatically revised accordingly. Cells 1206 and 1406 are similarly related to each other as are the cells previously discussed. There are numerous other task schedule cells similar to cell 1202 that map to associated management schedule cells for a particular individual, in this case, "TM," thus providing automatic updates of the high-level management schedule 1400 according to an aspect of the invention.

Updating a Project Schedule

Figure 15:
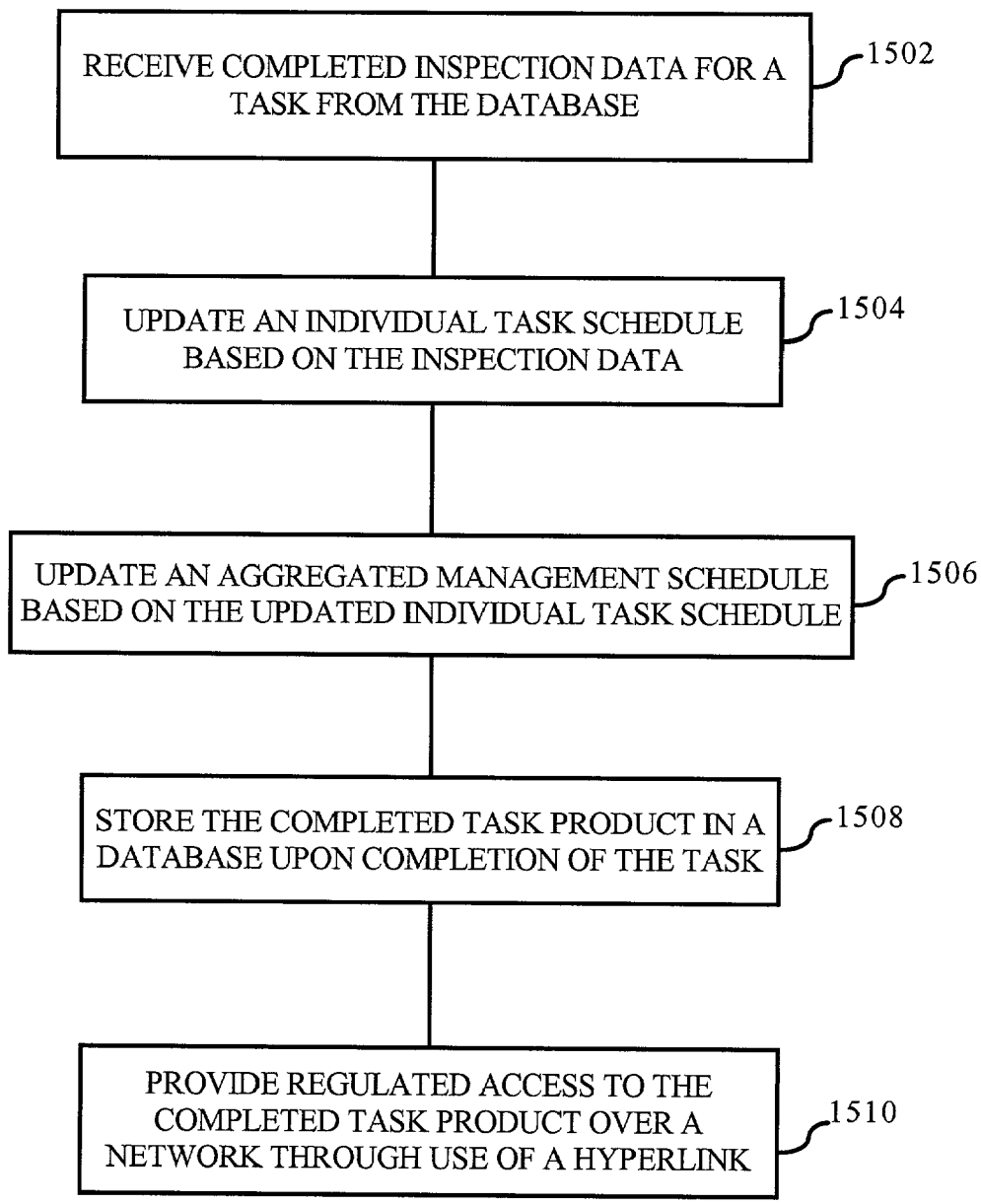
FIG. 15 is a flow chart illustrating steps for generating and updating a schedule for a project, according to an aspect of the invention.

FIG. 15 is a flow chart illustrating steps for generating and/or updating a schedule for a project, according to an aspect of the invention. At step 1502, a completed inspection form including the inspection data is received over a network from the database 106 (FIG. 1). A completed inspection form corresponds to the result of the inspection team meeting, held to inspect a task product, whereby the completed inspection form includes information based on the inspection. Refer back to FIG. 13 for an example of an inspection form 1300.

At step 1504, an individual's task schedule (i.e., the individual responsible for completing the task), is automatically updated based on the received inspection forms. According to a policy, a project task is not completed unless the inspection result report so indicates, or unless the chief inspector certifies the corrections to the product in the case where the inspection result indicates a conditional acceptance, as shown in FIG. 4D. At step 1506, a management schedule, as exemplified in FIG. 14 and which is an aggregation of all of the individual task schedules associated with the project, is automatically updated based on the updated individual task schedules from step 1504.

In one embodiment, the individual and management schedules are governed by a policy specifying that a project task cannot be partially completed and the automatic updating of the schedules is performed according to this policy.

At step 1508, the completed project task product is stored in the database 106 (FIG. 1 and FIG. 3) and access to the product is regulated according to a document control policy. In one embodiment, the completed task products are accessible via a packet-based network, such as the Internet or an enterprise network, via appropriate links such as hyperlinks.

Task Hierarchy

According to an embodiment of the invention, a task hierarchy is used to manage a development project. A task hierarchy represents relationships among tasks that are related to completion of a development project. In one embodiment, the relationships represent dependencies among task in the hierarchy, such that completion of a parent task depends on completion of one or more lower-level child tasks. Therefore, the dependencies specify how changes to a member task in the hierarchy affects other member tasks in the hierarchy, if at all. The use of a task hierarchy facilitates the automated update of project task schedules in response to changes to lower level task schedules.

Figure 16:
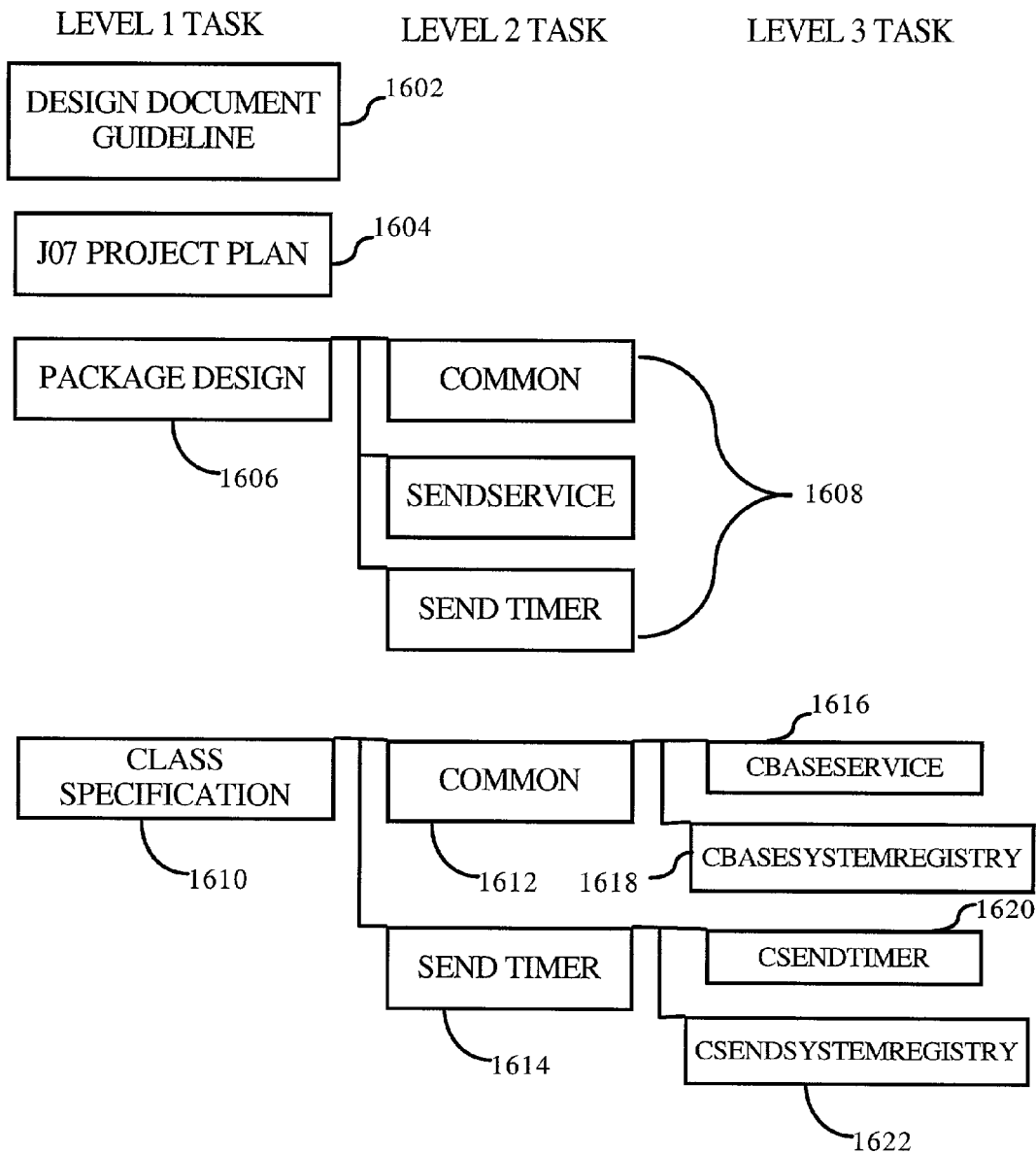
FIG. 16 depicts a task hierarchy that may be used to manage a development project, according to an embodiment of the invention.

FIG. 16 depicts a task hierarchy that may be used to manage a development project in accordance with an embodiment of the invention. The task hierarchy depicted in FIG. 16 includes three levels of tasks. These include level 1 tasks, level 2 tasks that are required to be completed to complete specific level 1 tasks, and level 3 tasks that are required to be completed to complete specific level 2 tasks. The number of levels of the hierarchy of tasks is not limited to three levels, as depicted in FIG. 16, but may comprise as many levels as necessary to define the major tasks and associated sub-tasks (or detail tasks) of a development project.

Note that a task at any particular level is not required to have associated sub-tasks. For example, task 1602 (Design Document Guideline) and task 1604 (J07 Project Plan), which are defined as level 1 tasks, are not defined to have any associated lower level tasks. In addition, the level 2 tasks collectively identified as tasks 1608 (Common, Send Service, and Send Timer), are not defined to have any associated level 3 tasks that require completion to complete the tasks 1608. As depicted in FIG. 16, tasks 1602, 1604, 1606, and 1610 are level 1 tasks (sometimes referred to as major tasks). The three tasks collectively identified as tasks 1608 are level 2 tasks which require completion in order to complete the associated level 1 task, that is, task 1606 (Package Design). In addition, task 1610 (Class Specification) is a level 1 task, which has two associated level 2 tasks, 1612 (Common) and 1614 (Send Timer). Furthermore, task 1612 has two associated level 3 tasks, 1616 (CBaseService) and 1618 (CBaseSystemRegistry), and task 1614 has two associated level 3 tasks, 1620 (CSendTimer) and 1622 (CSendSystemRegistry). The tasks depicted in FIG. 16 are for purposes of example only, to illustrate a hierarchy of tasks related to completion of a development project. Thus, practice of the invention is not limited to the tasks depicted.

Task Data Structure

Figure 17:
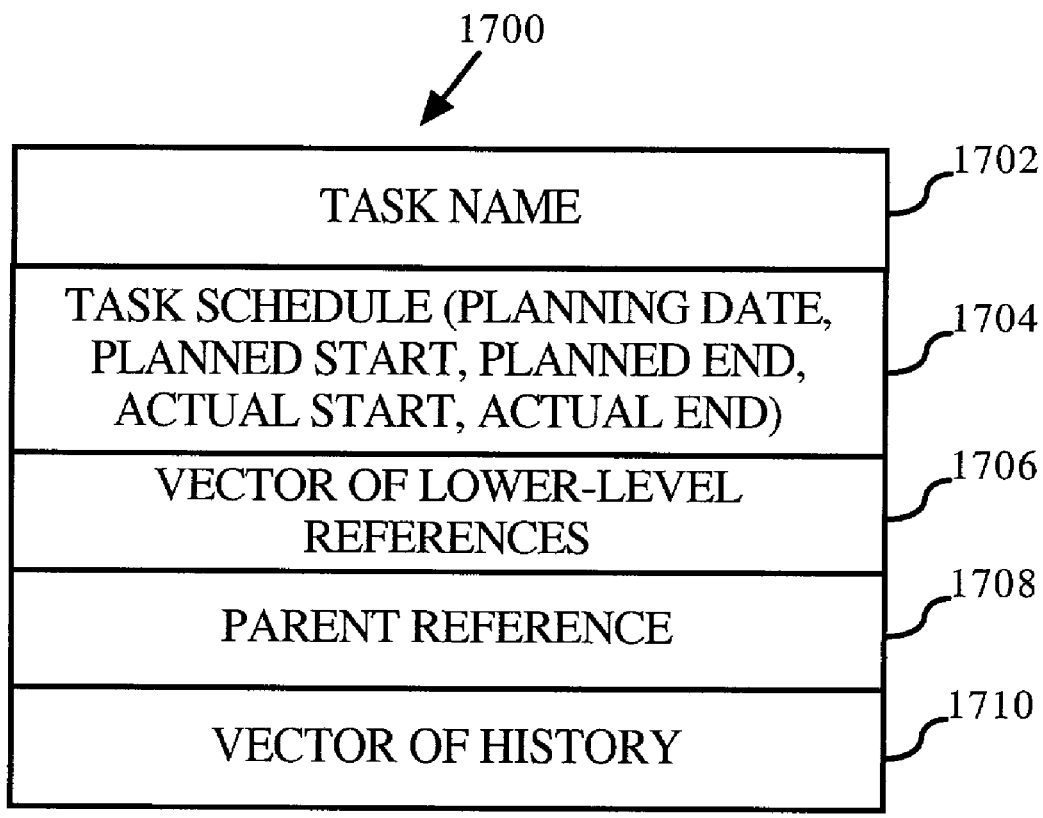
FIG. 17 is diagram graphically illustrating a task data structure, according to an embodiment of the invention.

FIG. 17 is diagram graphically illustrating a task data structure 1700, according to an embodiment of the invention. The data associated with each task is stored in some form of computer memory, for example without limitation, memory associated with database 106. Task data structure 1700 may be implemented using object-oriented programming techniques, whereby task data structure 1700 is defined as an object class, and each task is instantiated as an object with its corresponding data being states of the object. Practice or implementation of the invention is not limited to the use of object-oriented programming techniques, for other computer software programming techniques that are known in the art can be used to implement the techniques described herein.

FIG. 17 depicts task data structure 1700, implemented as an object class, wherein attributes include, but are not limited to, a task name 1702, a task schedule 1704, a vector of lower-level references 1706, a parent reference 1708, and a vector of history 1710. The task name 1702 is simply the name assigned to the task, used to identify the task object. An example of a task name 1702 is "CSendTimer" (reference 1620 of FIG. 16).

The task schedule 1704 comprises dates related to performance of the task. In one embodiment, the dates include a "planning date", a "planned start" date, a "planned end" date, an "actual start" date, and an "actual end" date. The planning date indicates the latest date on which any of the other task schedule dates were entered or updated. In one embodiment, the current date (i.e., the date on which an entry or change to a schedule is made) will automatically be retrieved from the system clock and entered into the appropriate planning date field. The substance of the other task schedule dates, that is, the planned and actual dates, is self-explanatory. Manipulation of these fields can be performed through use of an on-line task scheduler form, illustrated in FIG. 20 and described in reference thereto.

Implementation of the task schedule 1704 can take multiple forms and remain within the scope of the invention. For example without limitation, the task schedule 1704 can be implemented using vector, map, list, or struct classes of programming objects.

The vector of lower-level references 1706 is a programming tool used to provide references from a particular task to lower level tasks in the hierarchical structure of tasks. For example, a level 2 task, such as task 1612 (FIG. 16) has a vector of references that point to its associated lower-level, or child, tasks 1616 (FIG. 16) and 1618 (FIG. 16). The term "vector" refers to a class library associated with the C++ programming language, which provides an implementation of a 1-dimensional, random access sequence of items. Practice of the invention is not limited to the use of vectors in providing references from one task object to other task objects, for other referencing techniques can be implemented and still fall within the scope of the present invention.

The parent reference 1708 is used to provide a reference from a particular task to an associated higher level, or parent, task in the hierarchical structure of tasks. For example, a level 2 task, such as task 1612 (FIG. 16) has a parent reference to its associated parent task 1610. The parent reference 1708 is not limited to any particular form, and may take the form, for example, of a simple pointer from a task to its parent task. Use of the vector of references 1706 and the parent reference 1708 is described in more detail in reference to FIG. 18.

The vector of history 1710 provides a reference from a particular task to historical data related to the particular task. For example, the vector of history 1710 can be implemented as a simple pointer to a location of data representing historical dates associated with the particular task. Thus, a task schedule can include historical (or "old," or "obsolete") dates for any of the date fields, such as planned start, planned end, actual start, and actual end, along with current dates, such as referred to collectively as element 1210 of FIG. 12. This feature provides information on the incremental magnitude of a schedule slip or advance to a viewer of a task schedule.

Figure 18:
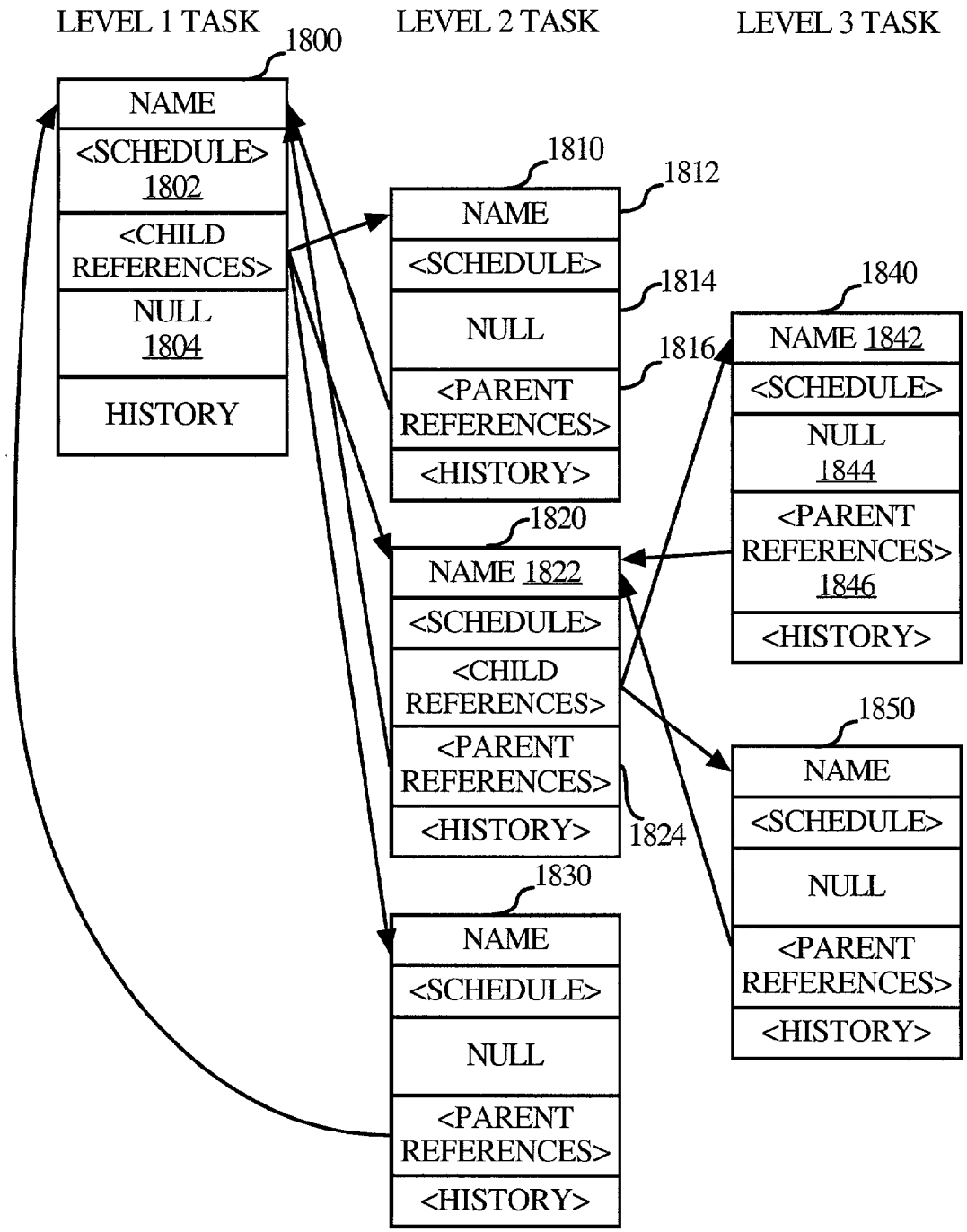
FIG. 18 is a diagram illustrating a hierarchical relationship of task data structures, according to an embodiment of the invention.

FIG. 18 is a diagram illustrating a hierarchical relationship of task data structures, visually depicting relations between task objects, according to an embodiment of the invention. FIG. 18 depicts Level 1 task object 1800; Level 2 task objects 1810, 1820, and 1830; and Level 3 task objects 1840 and 1850. Each of the objects is depicted as having the data structure illustrated in FIG. 17, including name, schedule, child references, parent references, and history. Some data fields have null values to represent fields with no relevant data, for example, parent reference field 1804 of task object 1800 (indicating no parents, and thus, no parent references), child references fields 1814 of task object 1810 (indicating no children, and thus, no child references), and child references fields 1844 of task object 1840 (indicating no children, and thus, no child references).

FIG. 18 illustrates the relationships and the interactions among multiple task objects for a development project, and the following example is used to assist in illustrating the object interactions. For example, if an update is made to the schedule data of task object 1840, then according to the techniques for automatic task schedule updating described herein, parent references 1846 of task object 1840 are accessed to identify the parent task of object 1840. Note that the parent references 1846 (generally, parent reference 1708 of FIG. 17) may be implemented as a vector, therefore, the task data structure 1700 allows a hierarchy of tasks in which a task may have more than one parent task. In the example, task object 1840 has a single parent task referred to in the parent references 1846, which is to task object 1820 which depends on the task associated with task object 1840 for completion. Once a parent task is identified, it is accessed to identify its child references. For example, the vector of lower-level references for task object 1820 points to the two children tasks of task object 1820, which are task object 1840 and task object 1850. Once the child tasks are identified, the schedule data for the child task objects is accessed and analyzed to determine whether any of the schedule dates of parent object 1820 requires updating as a result of the change to the schedule data of child object 1840. For example, if the actual end date of the task represented by task object 1840 is updated to be later than the actual end date represented by sibling task object 1850, then the parent task object 1820 requires an update to reflect the current actual end date of the parent task, and the schedule data of task object 1820 is updated accordingly.

Figure 21:
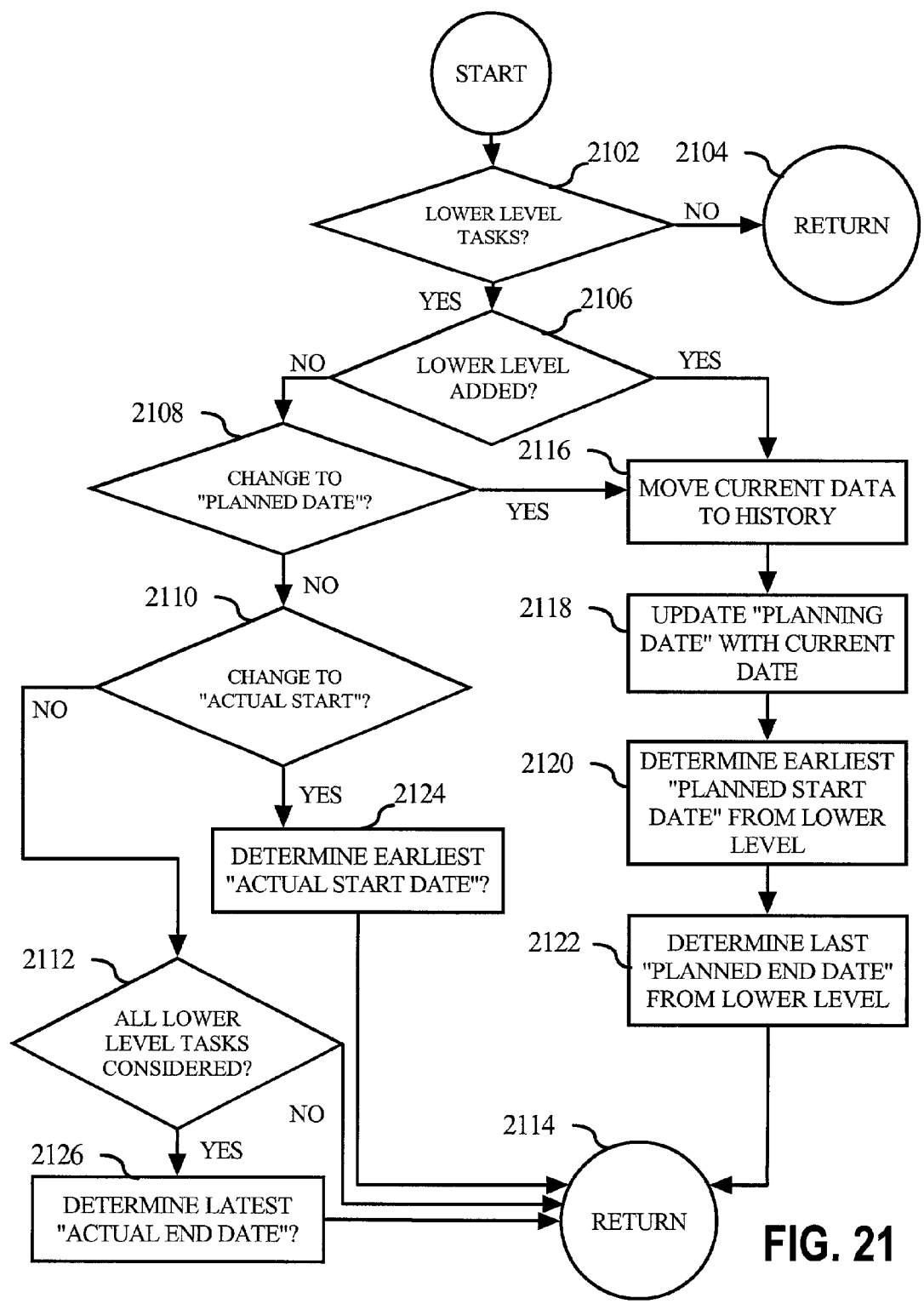
FIG. 21 is a flowchart illustrating a method for updating a task schedule data structure, according to an embodiment of the invention.

Furthermore, parent references of parent object 1820 are accessed to identify any parents of task object 1820, so that a determination can be made as to whether the schedule data of the parent task object at the next higher level requires updating as a result of the change to the schedule data of task object 1840 and the resultant change to object 1820. For example, the parent references of object 1820 points to task object 1800. Task object 1800 is accessed to identify its child references. For example, the vector of lower-level references for task object 1800 points to the three children tasks of task object 1800, which are task object 1810, task object 1820, and task object 1830. Once the child tasks are identified, the schedule data for the child task objects (i.e., 1810, 1820, and 1830) is accessed and analyzed to determine whether any of the schedule dates of their parent object 1800 requires updating as a result of the change to the schedule data of grandchild object 1840. This process is performed along all necessary levels of the task hierarchy until the top level (Level 1) is reached and any required updates to task schedules at the top level are determined. According to an embodiment of the invention, a method for updating a task schedule data structure, which illustrates in more detail the analysis of task schedule dates, is illustrated in FIG. 21.

Task Management Tools

FIG. 19 illustrates an example of an on-line task assignment form 1900, implemented in an embodiment of the invention to assign specific tasks to specific project participants. Task assignment form 1900 includes a "Tasks" column 1902 and an "Assigned to" column 1904. Columns 1902 and 1904 include data entry fields for entering a task name, such as "Common" for task 1612 (FIG. 16), in the fields of column 1902, and a project participant's name (or other identifying data, for example, employee number) in the fields of column 1904.

The task assignment form 1900 further includes pull-down menus, such as "Major Task List" menu 1906 and "Task Level" menu 1908. In certain instances, particular tasks may be required of a development project, due, for example, to company policy or the nature of the development project. In such instances, the menu 1906 can be programmed to include such required tasks. Consequently, the pull-down menu 1906 can be utilized by a project participant, for example, an engineering manager or project lead, when assigning project tasks through the on-line task assignment form 1900. Furthermore, as major, or high-level, tasks are identified for the project, they can be added to the menu 1906 by someone such as an administrator or a project manager. In one implementation, the menu 1906 includes only major tasks, defined as level 1 tasks, but the invention is not so limited. The "Task level" pull-down menu 1908 can be utilized by a managing project participant to assist in assigning levels (e.g., levels 1 through 3 of FIG. 16) to the tasks that are being entered into the system and assigned through on-line task assignment form 1900.

FIG. 20 illustrates an example of an on-line individual task scheduler form 2000, implemented in an embodiment of the invention to enter task schedule and hierarchy information.

Task scheduler form 2000 is an interface used to view tasks that are already entered into the system, as well as to enter tasks and associated dates. Task scheduler form 2000 includes a "Tasks" column 2002, which includes data entry fields for entering a task name, such as "Common" for task 1612 (FIG. 16), in the fields of column 2002. According to one embodiment, tasks that are entered into a database, such as database 106 (FIG. 1), are presented in task scheduler form 2000. In addition, the tasks that are presented in task scheduler form 2000 are presented in a manner representing their position in the task hierarchy. For example, column 2004 can display a "+", which can be clicked with a computer mouse or other pointing device, which causes display of associated lower-level tasks, preferably indented from their parent, or dependent, task. For example, clicking on the "+" in column 2002 adjacent to the "Package Design" task 1606 (FIG. 16), would cause a display of its related lower level tasks, that is, the "Common", "SendService", and "Send Timer" tasks collectively identified as tasks 1608 (FIG. 16). Furthermore, new lower-level tasks can be entered directly at this particular stage of the task hierarchy through the on-line individual task scheduler form 2000, and will, therefore, automatically be associated with the parent task (e.g., Package Design) currently being displayed. According to one embodiment, the association is a dependency, whereby a task depends on completion of one or more other tasks for its completion. The level 2 tasks are presented as to visually portray their position in the hierarchy, in relation to other tasks in the task hierarchy, such as through indentation.

Task scheduler form 2000 further includes pull-down menus, that is, "Major Task List" menu 2006 and "Task Level" menu 2008. These pull-down menus are used similarly to menus 1906 and 1908 of FIG. 19, to view and/or enter major tasks (menu 2006) and to specify hierarchical task levels (menu 2008).

Task scheduler form 2000 further includes several columns related to development project task performance and completion, which include data entry fields for entering and viewing the respective schedule dates for the tasks. The date columns include "Planned date" column 2010 (equivalent to "Identified Date" of FIG. 12 and "Planning Date" of FIG. 17), "Planned Start" column 2012, "Planned End" column 2014, "Actual Start" column 2016, and "Actual End" column 2018, which correspond to the task schedule 1704 (FIG. 17) data elements of the task objects.

Use of on-line task scheduler form 2000 operates upon the task objects that define the tasks. For any task, entering data in any of the columns 2002 and 2010-2018 creates or changes the state of the task object that defines the particular task. For example, entering or changing data in column 2002 affects the state of the task name 1702 attribute (FIG. 17), entering or changing data in columns 2010-2018 affects the state of the task schedule 1704 attribute (FIG. 17) and possibly the vector of history 1710 attribute (FIG. 17), and use of menu 2008 in relation to a particular task affects the state of the vector of lower level references 1706 (FIG. 17) and parent reference 1708 attributes (FIG. 17).

Method of Updating Task Schedule Data

FIG. 21 is a flowchart illustrating a process for updating a task schedule data structure, according to an embodiment of the invention. The process illustrated is triggered, for example, by an event such as entering or changing data at any level of the task hierarchy for a particular development project, through on-line task scheduler form 2000 or by completion of a task. This triggering event triggers the update process (FIG. 21) for the parent task, using the parent reference 1708 (FIG. 17). The process illustrated is operable at all levels of the task hierarchy, but is configured (as illustrated) such that from the standpoint of any given task, the process of updating the task "looks down" the task hierarchy to determine and implement an update to the given task.

Thus, for any given task, upon an action that triggers the update process for a project task schedule (such as management schedule 1400 of FIG. 14), at step 2102 it is determined whether the given task has any lower-level, or child, tasks (in relation to the task hierarchy described above). If no lower level tasks exist, the method returns with no action, at step 2104. For example, if a level 2 task with no associated level 3 tasks is being processed, the inquiry at step 2102 would be negative and the processing would return to the calling process. In one embodiment, the process returns to the triggering task, which was changed, for example, through the use of the task scheduler form 2000 of FIG. 20.

If the response at step 2102 is positive, that is, the given task does have lower-level tasks in the defined task hierarchy, then at step 2106 it is determined whether the triggering action was an addition of a lower-level task. If the response to step 2106 is negative, then at step 2108 it is determined whether the triggering action was a change to a "planned" date (i.e., planned start or planned end) of the task schedule 1704 data (FIG. 17) for a lower-level task. If the response to step 2108 is negative, then at step 2110 it is determined whether the actual start date has been updated for the given task. If the response to step 2110 is negative, then at step 2112 it is determined whether all of the lower-level tasks have been considered. If the response to step 2112 is negative, then the method returns to start at step 2114.

If the response to step 2112 is positive, then at step 2126 the latest actual end date from the lower-level tasks is retrieved and stored in the data structure of the given task. For example, the vector of lower-level references 1706 (FIG. 17) of the given task are accessed to identify all of the children of the given task. According to step 2126, the task schedule 1704 (FIG. 17) of each of the children tasks (referred to as lower-level tasks in block 2126) is accessed to determine the latest actual end date among them, which is then referenced within the task schedule 1704 of the given task. Hence, the change made to the task schedule 1704 of a triggering task is "rolled-up" into the task schedule 1704 of the given task, if necessary. If the change to the triggering task does not result in it having the latest actual end date among its sibling tasks (i.e., the tasks at the same hierarchical level with the same parent task), then no change to the given task schedule is required. Once step 2126 is completed, at step 2114 the process returns to the calling process. In one embodiment, step 2114 returns to the calling process of the child task manipulated in the task scheduler form 2000 (FIG. 20).

Returning to step 2110, if the response to step 2110 is positive (i.e., the actual start date of a lower-level task has been updated, which is the triggering event), then at step 2124 the earliest actual start date from the lower-level tasks of the given task are retrieved and stored in the data structure of the given task. According to step 2124, the task schedule 1704 (FIG. 17) of each of the lower-level tasks is accessed to determine the earliest actual start date among them, which is then referenced within the task schedule 1704 of the given task. Hence, the change made to the task schedule 1704 of a triggering child task is rolled-up into the task schedule 1704 of the given task, if necessary. If the change to the triggering task does not result in it having the earliest actual start date, then no change to the given task schedule is required. Once step 2124 is completed, at step 2114, the process returns to the calling process.

Returning to step 2108, if the response to step 2108 is positive (i.e., the planned start or end date of a lower-level task has been updated, which is the triggering event), then the process moves to step 2116, whereby the current data is moved to the vector of history 1710 (FIG. 17) for the given task.

Returning to step 2106, if the response at step 2106 is positive (i.e., a lower-level task has been added and associated with the given task), then at step 2116 the current data is moved to the vector of history 1710 (FIG. 17) for the given task. At step 2118, the current date is used as the planning date in task schedule 1704 (FIG. 17) for the given task. In addition, if it is determined that the revision to the triggering task requires revisions to another related parent task of the triggering task, then the current date is also used as the planning date in the other parent's task schedule 1704. In one embodiment, the current data is retrieved from the system clock of the computer platform, such as workstation 102 (FIG. 1) or computer system 200 (FIG. 2), on which the project management system executes.

At step 2120, the earliest planned start date from the lower-level tasks (which includes the triggering task) is retrieved and stored in the data structure of the given task. According to step 2120, the task schedule 1704 (FIG. 17) of each of the lower-level tasks is accessed to determine the earliest planned start date among them, which is then referenced within the task schedule 1704 of the given task. Hence, the change made to the task schedule 1704 of the triggering child task is rolled-up into the task schedule 1704 of the given task, if necessary. If the change to the triggering task is not to the planned start date, then the logic simply moves to step 2122. If the change to the triggering task does not result in it having the earliest planned start date, then no consequent change to the given task schedule is required.

Alternately, the logic of FIG. 21 could contain a decision block prior to step 2120, wherein it is determined whether the change to the planned date is a change to the planned start date or to the planned end date, and then the logic could continue to either step 2120 or step 2122 depending on the result from the decision block.

Returning to the method as depicted in FIG. 21, at step 2122, the latest planned end date from the lower-level tasks is retrieved and stored in the data structure of the given task, similarly as described above with respect to step 2120. Again, the change made to the task schedule 1704 of the triggering task is rolled-up into the task schedule 1704 of the given task, if necessary. If the change to the triggering child task does not result in it having the latest planned end date, then no change to the given task schedule is required. Once step 2122 is completed, at step 2114 the process returns to the start.

Throughout the process depicted in FIG. 21, if any of the schedule entries of the given task change, the given task will trigger the same process of FIG. 21 in its parent task through the reference to the parent task 1708 (FIG. 17). Because the process of FIG. 21 is triggered by the child task, step 2102 is the safety check to prevent unrelated processes to trigger the process flow of FIG. 21.

Hence, the foregoing detailed description describes techniques for automated management of development project files over a network, including automated task schedule updating. In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for generating a hierarchy used in managing a schedule for a development project, the method comprising the computer-implemented steps of:

generating reference data for a task in the hierarchy, the reference data referencing one or more other tasks at other levels in the hierarchy, wherein the hierarchy specifies relationships among tasks related to completion of the development project, wherein the step of generating reference data comprises:

receiving specification of one or more tasks assigned to at least one specified project participant, wherein the one or more tasks are assigned through use of a computer generated web browser interface communicatively coupled to a project database over the network, and wherein the one or more tasks are specified with an associated hierarchical level; and receiving specification of one or more detail tasks hierarchically related to at least one of the one or more tasks, wherein the detail tasks are sub-tasks requiring completion to complete the at least one task, and wherein the one or more detail tasks are specified using a computer generated web browser interface communicatively coupled to a project database over the network, and wherein the one or more detail tasks are specified with an associated hierarchical level;

generating schedule data for the task, the schedule data including one or more schedule dates associated with the task;

wherein the schedule data includes (a) historical schedule data that includes one or more obsolete planned schedule dates associated with the task if a corresponding planned schedule date associated with the task has been changed, and (b) one or more current schedule dates associated with the task;

storing the schedule data and the reference data in a database accessible over a network via a web browser; and causing a web server to display the schedule, including causing concurrent display of both the one or more obsolete planned schedule dates associated with the task and the one or more current schedule dates associated with the task.

2. The method of claim 1 wherein the step of generating the reference data comprises generating references to sub-tasks that must be completed for completion of the task.

3. The method of claim 1 wherein the step of generating the reference data comprises generating references to parent tasks that rely on completion of at least the task for completion.

4. The method of claim 1, wherein the relationships represented by the hierarchy represent dependencies among tasks in the hierarchy such that completion of a parent task depends on completion of one or more associated child tasks, and wherein the step of generating reference data includes generating reference data according to the dependencies.

5. The method of claim 1, further comprising the computer-implemented steps of:

in response to an update to schedule data associated with a particular task, determining whether an update to the schedule data associated with one or more other tasks hierarchically related to the particular task is required, by:
following a reference from the reference data of the particular task up the hierarchy to a parent task that relies on completion of the particular task for completion;
following a reference from the reference data of the parent task down the hierarchy to one or more tasks that must be completed for completion of the parent task;
comparing the schedule data of the one or more tasks.

6. The method of claim 1, wherein the development project is a computer software development project and the tasks are related to completion of the software development project, and wherein the steps of generating reference data and generating schedule data are performed based on the computer software development project.

7. The method of claim 1, wherein causing comprises causing the web server to display the obsolete planned schedule dates with strikethrough.

8. The method of claim 1, wherein generating the schedule data comprises calculating, based at least upon one or more schedule dates for said one or more detail tasks, the one or more current schedule dates for the schedule data.

9. A method for managing a schedule for a development project, the method comprising the computer-implemented steps of:
detecting an update to schedule data for a particular task from a plurality of tasks specified for the development project and organized as a hierarchy of interdependent tasks;
in response to the update, traversing the hierarchy to determine whether an update to schedule data for one or more other tasks from the plurality of tasks is required, by:
following a reference up the hierarchy from reference data associated with the particular task to reference data associated with a parent task, wherein the parent task relies on completion of the particular task for completion;
following a reference down the hierarchy from reference data associated with the parent task to schedule data associated with each of one or more tasks that must be completed for completion of the parent task;
comparing the schedule data of the one or more tasks;
if an update to an actual start date of the parent task is required, then determining an updated actual start date that is the earliest actual start date associated with the one or more tasks;
if an update to an actual end date of the parent task is required, then determining an updated actual end date that is the latest actual end date associated with the one or more tasks;
if an update to a planned start date of the parent task is required, then determining an updated planned start date that is the earliest planned start date associated with the one or more tasks; and
if an update to a planned end date of the parent task is required, then determining an updated planned end date that is the latest planned end date associated with the one or more tasks.

10. The method of claim 9, wherein the step of determining whether an update to the schedule data is required includes determining whether an update to the schedule data of the parent task is required.

11. The method of claim 9, wherein the step of determining whether an update to the schedule data is required includes,
determining that an update to an actual start date of the parent task is required; and
determining an updated actual start date that is the earliest actual start date associated with the one or more tasks.

12. The method of claim 9, wherein the step of determining whether an update to the schedule data is required includes,
determining that an update to an actual end date of the parent task is required; and
determining an updated actual end date that is the latest actual end date associated with the one or more tasks.

13. The method of claim 9, wherein the step of determining whether an update to the schedule data is required includes,
determining that an update to a planned start date of the parent task is required; and
determining an updated planned start date that is the earliest planned start date associated with the one or more tasks.

14. The method of claim 9, wherein the step of determining whether an update to the schedule data is required includes,
determining that an update to a planned end date of the parent task is required; and
determining an updated planned end date that is the latest planned end date associated with the one or more tasks.

15. The method of claim 9, wherein the development project is a computer software development project and the plurality of tasks are related to completion of the software development project, and wherein the steps of detecting an update to schedule data and determining whether an update is required are performed based on the computer software development project.

16. The method of claim 9, wherein the schedule data for a particular task pertains to an individual task schedule, and wherein the parent task pertains to a management schedule.

17. A computer-readable storage medium carrying one or more sequences of instructions for generating a hierarchy used in managing a schedule for a development project, wherein execution of the one or more sequences of instructions by one or more processors causes the one or more processors to perform the steps of:
generating reference data for a task in the hierarchy, the reference data referencing one or more other tasks at other levels in the hierarchy, wherein the hierarchy specifies relationships among tasks related to completion of the development project;
wherein the step of generating reference data comprises:
receiving specification of one or more tasks assigned to at least one specified project participant, wherein the one or more tasks are assigned through use of a computer generated web browser interface communicatively coupled to a project database over the network, and wherein the one or more tasks are specified with an associated hierarchical level; and
receiving specification of one or more detail tasks hierarchically related to at least one of the one or more tasks, wherein the detail tasks are sub-tasks requiring completion to complete the at least one task, and wherein the one or more detail tasks are specified using a computer generated web browser interface communicatively coupled to a project database over the network, and wherein the one or more detail tasks are specified with an associated hierarchical level;
generating schedule data for the task, the schedule data including one or more schedule dates associated with the task;

wherein the schedule data includes (a) historical schedule data that includes one or more obsolete planned schedule dates associated with the task if a corresponding planned schedule date associated with the task has been changed, and (b) one or more current schedule dates associated with the task;

storing the schedule data and the reference data in a database accessible over a network via a web browser; and causing a web server to display the schedule, including causing concurrent display of both the one or more obsolete planned schedule dates associated with the task and the one or more current schedule dates associated with the task.

18. The computer-readable storage medium of claim 17 wherein execution of the one or more sequences of instructions by one or more processors causes the one or more processors to perform the step of generating the reference data by generating references to sub-tasks that must be completed for completion of the task.

19. The computer-readable storage medium of claim 17 wherein execution of the one or more sequences of instructions by one or more processors causes the one or more processors to perform the step of generating the reference data by generating references to parent tasks that rely on completion of at least the task for completion.

20. The computer-readable storage medium of claim 17 wherein execution of the one or more sequences of instructions by one or more processors causes the one or more processors to perform the step of:

in response to an update to the schedule data associated with a particular task, determining whether an update to the schedule data associated with one or more other tasks hierarchically related to the particular task is required, by:
following a reference from the particular task up the hierarchy to a parent task that relies on completion of the particular task for completion;
following a reference from the parent task down the hierarchy to one or more tasks that must be completed for completion of the parent task;
comparing the schedule data of the one or more tasks.

21. The computer-readable storage medium of claim 17, wherein the development project is a computer software development project and the tasks are related to completion of the software development project, and wherein execution of the one or more sequences of instructions by one or more processors causes the one or more processors to perform the step of generating reference data and generating schedule data based on the computer software development project.

22. The computer-readable storage medium of claim 17, wherein causing comprises causing the web server to display the obsolete planned schedule dates with strikethrough.

23. The computer-readable storage medium of claim 17, wherein the relationships represented by the hierarchy represent dependencies among tasks in the hierarchy such that completion of a parent task depends on completion of one or more associated child tasks, and wherein the step of generating reference data includes generating reference data according to the dependencies.

24. The computer-readable medium of claim 17, wherein the schedule data for a particular task pertains to an individual task schedule, and wherein the parent task pertains to a management schedule.

25. The computer-readable medium of claim 17, wherein generating the schedule data comprises calculating, based at least upon one or more schedule dates for said one or more detail tasks, the one or more current schedule dates.

26. A computer-readable storage medium carrying one or more sequences of instructions for managing a schedule for a development project, wherein execution of the one or more sequences of instructions by one or more processors causes the one or more processors to perform the steps of:

detecting an update to schedule data for a particular task from a plurality of tasks specified for the development project and organized as a hierarchy of interdependent tasks;

in response to the update, traversing the hierarchy to determine whether an update to schedule data for one or more other tasks from the plurality of tasks is required, by:
following a reference up the hierarchy from reference data associated with the particular task to reference data associated with a parent task, wherein the parent task relies on completion of the particular task for completion;
following a reference down the hierarchy from reference data associated with the parent task to schedule data associated with each of one or more tasks that must be completed for completion of the parent task;
comparing the schedule data of the one or more tasks;
if an update to an actual start date of the parent task is required, then determining an updated actual start date that is the earliest actual start date associated with the one or more tasks;
if an update to an actual end date of the parent task is required, then determining an updated actual end date that is the latest actual end date associated with the one or more tasks;
if an update to a planned start date of the parent task is required, then determining an updated planned start date that is the earliest planned start date associated with the one or more tasks; and
if an update to a planned end date of the parent task is required, then determining an updated planned end date that is the latest planned end date associated with the one or more tasks.

27. The computer-readable storage medium of claim 26, wherein execution of the one or more sequences of instructions by one or more processors causes the one or more processors to perform the step of determining whether an update to the schedule data is required by determining whether an update to the schedule data of the parent task is required.

28. The computer-readable storage medium of claim 26, wherein the development project is a computer software development project and the plurality of tasks are related to completion of the software development project, and wherein execution of the one or more sequences of instructions by one or more processors causes the one or more processors to perform the steps of detecting an update to schedule data and determining whether an update is required based on the computer software development project.

29. A computer-readable storage medium carrying data that represents one or more data items, each data item being associated with a task related to completion of a development project, the data comprising:

reference data that references one or more other data items associated with tasks at other hierarchical levels of a hierarchy that represents relationships between development project tasks,
wherein generating the reference data comprises:
receiving specification of one or more tasks assigned to at least one specified project participant, wherein the one or more tasks are assigned through use of a computer generated web browser interface communicatively coupled to a project database over the network, and wherein the one or more tasks are specified with an associated hierarchical level; and receiving specification of one or more detail tasks hierarchically related to at least one of the one or more tasks, wherein the detail tasks are sub-tasks requiring completion to complete the at least one task, and wherein the one or more detail tasks are specified using a computer generated web browser interface communicatively coupled to a project database over the network, and wherein the one or more detail tasks are specified with an associated hierarchical level; and schedule data that includes one or more current schedule dates and one or more obsolete schedule dates associated with completion of the task associated with the particular data item;

wherein, in response to an update from a web browser to the schedule data associated with a particular task, a computer processor can automatically update the schedule data associated with one or more other tasks hierarchically related to the particular task to reflect the change to the schedule data associated with the particular task, at least in part by following, in the hierarchy, references in the reference data.

30. The computer-readable storage medium of claim 29, wherein the relationships represented by the hierarchy represent dependencies among tasks in the hierarchy such that completion of a parent task depends on completion of one or more associated child tasks.

31. The computer-readable storage medium of claim 29, wherein the development project is a computer software development project and the tasks are related to completion of the software development project, and wherein the reference data and the schedule data are based on the computer software development project.

32. A computer apparatus comprising:
a memory; and
one or more processors coupled to the memory and configured to execute one or more sequence of instructions for generating a hierarchy used in managing a development project, wherein execution of the one or more sequences of instructions by one or more processors causes the one or more processors to perform the steps of:
generating reference data for a task in the hierarchy, the reference data referencing one or more other tasks at other levels in the hierarchy, wherein the hierarchy specifies relationships among tasks related to completion of the development project;
wherein the step of generating reference data comprises:
receiving specification of one or more tasks assigned to at least one specified project participant, wherein the one or more tasks are assigned through use of a computer generated web browser interface communicatively coupled to a project database over the network, and wherein the one or more tasks are specified with an associated hierarchical level; and
receiving specification of one or more detail tasks hierarchically related to at least one of the one or more tasks, wherein the detail tasks are sub-tasks requiring completion to complete the at least one task, and wherein the one or more detail tasks are specified using a computer generated web browser interface communicatively coupled to a project database over the network, and wherein the one or more detail tasks are specified with an associated hierarchical level;

generating schedule data for the task, the schedule data including one or more schedule dates associated with the task;

wherein the schedule data includes (a) historical schedule data that includes one or more obsolete planned schedule dates associated with the task if a corresponding planned schedule date associated with the task has been changed, and (b) one or more current schedule dates associated with the task;

storing the schedule data and the reference data in a database accessible over a network via a web browser; and causing a web server to display the schedule, including causing concurrent display of both the one or more obsolete planned schedule dates associated with the task and the one or more current schedule dates associated with the task.

33. The computer apparatus of claim 32, wherein the step of generating the reference data comprises generating references to sub-tasks that must be completed for completion of the task.

34. The computer apparatus of claim 32, wherein the step of generating the reference data comprises generating references to parent tasks that rely on completion of at least the task for completion.

35. The computer apparatus of claim 32, wherein the relationships represented by the hierarchy represent dependencies among tasks in the hierarchy such that completion of a parent task depends on completion of one or more associated child tasks, and wherein the step of generating reference data includes generating reference data according to the dependencies.

36. The computer apparatus of claim 32, wherein execution of the one or more sequences of instructions by one or more processors further causes:

in response to an update to schedule data associated with a particular task, determining whether an update to the schedule data associated with one or more other tasks hierarchically related to the particular task is required, by:
following a reference from the reference data of the particular task up the hierarchy to a parent task that relies on completion of the particular task for completion;
following a reference from the reference data of the parent task down the hierarchy to one or more tasks that must be completed for completion of the parent task;
comparing the schedule data of the one or more tasks.

37. The computer apparatus of claim 32, wherein the development project is a computer software development project and the tasks are related to completion of the software development project, and wherein the steps of generating reference data and generating schedule data are performed based on the computer software development project.

38. The computer apparatus of claim 32, wherein causing comprises causing the web server to display the obsolete planned schedule dates with strikethrough.

39. The computer apparatus of claim 32, wherein the schedule data for a particular task pertains to an individual task schedule, and wherein the parent task pertains to a management schedule.

40. The computer apparatus of claim 32, wherein generating the schedule data comprises calculating, based at least upon one or more schedule dates for said one or more detail tasks, the one or more current schedule dates for the schedule data.

41. A computer apparatus comprising:
means for generating reference data for a task in the hierarchy, the reference data referencing one or more other tasks at other levels in the hierarchy, wherein the hierarchy specifies relationships among tasks related to completion of the development project, said means comprising:
  means for receiving specification of one or more tasks assigned to at least one specified project participant, wherein the one or more tasks are assigned through use of a computer generated web browser interface communicatively coupled to a project database over the network, and wherein the one or more tasks are specified with an associated hierarchical level; and
  means for receiving specification of one or more detail tasks hierarchically related to at least one of the one or more tasks, wherein the detail tasks are sub-tasks requiring completion to complete the at least one task, and wherein the one or more detail tasks are specified using a computer generated web browser interface communicatively coupled to a project database over the network, and wherein the one or more detail tasks are specified with an associated hierarchical level;
means for generating schedule data for the task, the schedule data including one or more schedule dates associated with the task;
  wherein the schedule data includes (a) historical schedule data that includes one or more obsolete planned schedule dates associated with the task if a corresponding planned schedule date associated with the task has been changed, and (b) one or more current schedule dates associated with the task;
means for storing the schedule data and the reference data in a database accessible over a network via a web browser; and
means for causing a web server to display the schedule, including causing concurrent display of both the one or more obsolete planned schedule dates associated with the task and the one or more current schedule dates associated with the task.

42. A computer apparatus comprising:
a memory; and
one or more processors coupled to the memory and configured to execute one or more sequence of instructions for generating a hierarchy used in managing a development project, wherein execution of the one or more sequences of instructions by one or more processors causes the one or more processors to perform the steps of:
  detecting an update to schedule data for a particular task from a plurality of tasks specified for the development project and organized as a hierarchy of interdependent tasks;
  in response to the update, traversing the hierarchy to determine whether an update to schedule data for one or more other tasks from the plurality of tasks is required, by:
    following a reference up the hierarchy from reference data associated with the particular task to reference data associated with a parent task, wherein the parent task relies on completion of the particular task for completion;
    following a reference down the hierarchy from reference data associated with the parent task to schedule data associated with each of one or more tasks that must be completed for completion of the parent task;
  comparing the schedule data of the one or more tasks;
  if an update to an actual start date of the parent task is required, then determining an updated actual start date that is the earliest actual start date associated with the one or more tasks;
  if an update to an actual end date of the parent task is required, then determining an updated actual end date that is the latest actual end date associated with the one or more tasks;
  if an update to a planned start date of the parent task is required, then determining an updated planned start date that is the earliest planned start date associated with the one or more tasks; and
  if an update to a planned end date of the parent task is required, then determining an updated planned end date that is the latest planned end date associated with the one or more tasks.

\* \* \* \* \*